US008581937B2

(12) United States Patent
Intwala

(10) Patent No.: US 8,581,937 B2
(45) Date of Patent: Nov. 12, 2013

(54) SEAM-BASED REDUCTION AND EXPANSION OF IMAGES USING PARTIAL SOLUTION MATRIX DEPENDENT ON DYNAMIC PROGRAMMING ACCESS PATTERN

(75) Inventor: Chintan Intwala, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 976 days.

(21) Appl. No.: 12/251,163

(22) Filed: Oct. 14, 2008

(65) Prior Publication Data

US 2013/0120407 A1    May 16, 2013

(51) Int. Cl.
G09G 5/00    (2006.01)
G06F 15/80    (2006.01)
G06T 1/60    (2006.01)
G06K 9/20    (2006.01)
G06K 9/32    (2006.01)
G06K 9/54    (2006.01)
G05B 19/18    (2006.01)

(52) U.S. Cl.
USPC ........... 345/660; 345/505; 345/530; 382/282; 382/298; 382/304; 382/305; 700/4

(58) Field of Classification Search
USPC ......... 345/620, 621, 660, 661, 666, 606, 619, 345/634, 635, 501–503, 505, 506, 520, 530, 345/548; 382/254, 276, 282, 293, 298, 300, 382/303–305; 700/1–5; 710/20–23; 711/100, 118–120, 123; 714/1, 5.11, 714/6.1, 10–12
See application file for complete search history.

(56) References Cited

U.S. PATENT DOCUMENTS

| | | | |
|---|---|---|---|
| 4,394,693 | A | 7/1983 | Shirley |
| 5,434,414 | A | 7/1995 | Berlad et al. |
| 5,438,202 | A | 8/1995 | Matanzon et al. |
| 5,559,901 | A | 9/1996 | Lobregt |
| 5,577,179 | A | 11/1996 | Blank |
| 5,587,742 | A | 12/1996 | Hau et al. |
| 5,732,230 | A | 3/1998 | Cullen et al. |

(Continued)

OTHER PUBLICATIONS

Jacob Stultz, Seam Carving: Parallelizing a novel new image resizing algorithm, May 16, 2008, http://beowulf.lcs.mit.edu/18.337-2008/projects/reports/stultz-6338.pdf.*

(Continued)

*Primary Examiner* — Wesner Sajous
*Assistant Examiner* — Andrew Shin
(74) *Attorney, Agent, or Firm* — Wolfe-SBMC

(57) ABSTRACT

Systems, methods, and computer-readable storage media for resizing images using seam carving techniques may include generation of a partial solution matrix by at least partially isolating dependencies between sub-problems of a dynamic programming problem corresponding to its solution within different regions of an input image. The number and/or shape of the isolated (or partially isolated) sub-problems may be dependent on the access pattern used by a dynamic programming operation to identify seams in the input image. Multiple sub-problems may be processed independently and in parallel on respective processor core(s) or threads thereof to generate the partial solution matrix. The partial solution matrix may then be processed to identify one or more low-cost seams of the input image. The methods may be implemented as stand-alone applications or as program instructions implementing components of a graphics application, executable by a CPU and/or GPU configured for parallel processing.

29 Claims, 11 Drawing Sheets

(56) References Cited

U.S. PATENT DOCUMENTS

| | | | |
|---|---|---|---|
| 5,768,413 | A | 6/1998 | Levin et al. |
| 5,790,708 | A | 8/1998 | Delean |
| 5,906,005 | A | 5/1999 | Niskala et al. |
| 6,157,389 | A | 12/2000 | Knowlton |
| 6,195,445 | B1 | 2/2001 | Dubuisson-Jolly et al. |
| 6,563,964 | B1 | 5/2003 | Hallberg |
| 6,597,411 | B1 | 7/2003 | Selby |
| 6,782,128 | B1 | 8/2004 | Rinehart |
| 6,825,857 | B2 | 11/2004 | Harasimiuk |
| 6,919,903 | B2 | 7/2005 | Freeman et al. |
| 6,943,807 | B2 | 9/2005 | Xavier |
| 6,985,641 | B1 | 1/2006 | Michel et al. |
| 7,038,185 | B1 | 5/2006 | Tumblin et al. |
| 7,168,038 | B2 | 1/2007 | Lui et al. |
| 7,386,183 | B2 | 6/2008 | Tamura |
| 7,411,628 | B2 | 8/2008 | Tian et al. |
| 7,477,800 | B2 | 1/2009 | Avidan et al. |
| 7,529,429 | B2 | 5/2009 | Rother et al. |
| 7,532,771 | B2 | 5/2009 | Taylor et al. |
| 7,602,398 | B2 | 10/2009 | Zhou et al. |
| 7,747,107 | B2 | 6/2010 | Avidan et al. |
| 7,778,492 | B2 | 8/2010 | Ignatchenko et al. |
| 7,823,211 | B2 | 10/2010 | Matsukawa et al. |
| 7,873,211 | B1 | 1/2011 | Grundmann et al. |
| 8,023,153 | B2 | 9/2011 | Bernal et al. |
| 8,077,356 | B2 | 12/2011 | Bernal et al. |
| 8,077,357 | B2 | 12/2011 | Bernal et al. |
| 8,098,404 | B2 | 1/2012 | Bernal et al. |
| 8,160,398 | B1 | 4/2012 | Avidan et al. |
| 8,180,177 | B1 | 5/2012 | Intwala |
| 8,218,900 | B1 | 7/2012 | Avidan et al. |
| 8,265,424 | B1 | 9/2012 | Avidan et al. |
| 8,270,765 | B1 | 9/2012 | Avidan et al. |
| 8,280,186 | B1 | 10/2012 | Avidan et al. |
| 8,280,187 | B1 | 10/2012 | Avidan et al. |
| 8,280,191 | B1 | 10/2012 | Avidan et al. |
| 8,290,300 | B2 | 10/2012 | Avidan et al. |
| 8,358,876 | B1 | 1/2013 | Gilra et al. |
| 2002/0006234 | A1 | 1/2002 | Horiuchi |
| 2003/0002736 | A1 | 1/2003 | Maruoka et al. |
| 2003/0234866 | A1 | 12/2003 | Cutler |
| 2006/0017739 | A1 | 1/2006 | Fang et al. |
| 2006/0072853 | A1 | 4/2006 | Clarke et al. |
| 2006/0104542 | A1 | 5/2006 | Blake et al. |
| 2006/0177150 | A1 | 8/2006 | Uyttendaele et al. |
| 2007/0025637 | A1 | 2/2007 | Setlur et al. |
| 2007/0136685 | A1 | 6/2007 | Bhatla et al. |
| 2007/0237420 | A1 | 10/2007 | Steedy et al. |
| 2008/0036789 | A1 | 2/2008 | de Leon |
| 2008/0095470 | A1 | 4/2008 | Chao et al. |
| 2008/0143744 | A1 | 6/2008 | Agarwala |
| 2008/0198175 | A1 | 8/2008 | Sun et al. |
| 2008/0219587 | A1* | 9/2008 | Avidan et al. ............ 382/276 |
| 2008/0267528 | A1 | 10/2008 | Avidan et al. |
| 2009/0033683 | A1 | 2/2009 | Schiff et al. |
| 2009/0033773 | A1 | 2/2009 | Kinoshita et al. |
| 2009/0290794 | A1 | 11/2009 | Marchesotti |
| 2009/0317010 | A1 | 12/2009 | Gerhard et al. |
| 2010/0013827 | A1 | 1/2010 | Fillion et al. |
| 2010/0027876 | A1 | 2/2010 | Avidan et al. |
| 2010/0124371 | A1 | 5/2010 | Jiang et al. |
| 2010/0128181 | A1 | 5/2010 | Jagmag |
| 2010/0142853 | A1 | 6/2010 | Fillion et al. |
| 2010/0232729 | A1 | 9/2010 | Peleg et al. |
| 2010/0266208 | A1 | 10/2010 | Downing et al. |
| 2010/0303384 | A1 | 12/2010 | Knee |
| 2011/0182502 | A1 | 7/2011 | Liang |
| 2011/0200274 | A1 | 8/2011 | Luo et al. |
| 2011/0211771 | A1 | 9/2011 | Rubenstein et al. |
| 2012/0092357 | A1 | 4/2012 | Wang et al. |
| 2013/0120442 | A1 | 5/2013 | Dhawan |
| 2013/0121619 | A1 | 5/2013 | Intwala |
| 2013/0127915 | A1 | 5/2013 | Gilra |

OTHER PUBLICATIONS

Itti L et al. "A Model of Saliency-Based Visual Attention for Rapid Scene Analysis" IEEE transaction on Pattern Analysis and Machine Intelligence, IEEE Service Center, Los Alamitos, CA, US, vol. 20, No. 11, Nov. 1, 1998, pp. 1254-1259.
Avidan S. et al.: "Seam Carving for Content-Aware Image Resizing" ACM Transactions on Graphics, ACM, US, vol. 26, No. 3, Jul. 1, 2007, pp. 10-11, XP007904203.
Agarwala et al., "Interactive digital photomontage," ACM Trans. Graph. 23, 3, 294-302, 2004. Santella et al., "Gaze-based interaction for semiautomatic photo cropping," ACM Human Factors in Computing Systems (CHI), 771-780, 2006.
Perez et al., 2003. Poisson Image Editing. SIGGRAPH'03. ACM, New York, NY, pp. 313-318.
Lui et al., "IEEE Transactions on Pattern Analysis and Machine Intelligence, vol. 30, No. 2, Feb. 2008," 16 pages.
Suh et al., 2003. Automatic thumbnail cropping and its effectiveness. UIST '03: Proceedings of the 16th annual ACM symposium on User interface software and technology, ACM Press, New York, NY, USA, pp. 95-104.
Chen et al., 2003. A visual attention model for adapting images on small displays. Multimedia Systems 9, 4, pp. 353-364.
Jacobs et al. 2003. Adaptive grid-based document layout. Proceedings of ACM SIGGRAPH, pp. 838-847.
Liu et al., 2005. Automatic image retargeting with fisheye-view warping. ACM UIST, pp. 153-162.
Setlur et al., 2005. Automatic image retargeting. Mobile and Ubiquitous Multimedia (MUM), ACM Press.
Gal et al., 2006. Feature aware texturing. Eurographics Symposium on Rendering.
Sun et al. 2005. Image completion with structure propagation. Proceedings of ACM SIGGRAPH, pp. 861-868.
Jia et al., 2006. Drag-and-drop pasting. Proceedings of SIGGRAPH, 6 pages.
Rother et al., 2006. AutoCollage. Proceedings of SIGGRAPH.
Wang et al., 2006. Simultaneous matting and compositing. Microsoft Research Technical Report, MSR-TR 2006-63 (May), 8 pages.
Zomet et al., 2006. Seamless image stitching by minimizing false edges. IEEE Transactions on Image Processing 15, 4, pp. 969-977.
Bertalmio et al., 2003. Simultaneous structure and texture image inpainting. Proceedings IEEE Conference on Computer Vision and Pattern Recognition, 13 pages.
Drori et al. 2003. Fragment-based image completion. Proceedings of ACM SIGGRAPH, pp. 303-312.
Criminisi et al., 2003. Object removal by exemplar-based inpainting. IEEE Conference on Computer Vision and Pattern Recognition, pp. 417-424.
Avidan, Shai and Shamir, Ariel; "Seam carving for content-aware image resizing," ACM Transactions on Graphics (TOG) archive, vol. 26 , Issue 3 (Jul. 2007), Proceedings of ACM SIGGRAPH 2007.
alZahir, S., "A perceptually perfect image resizing scheme," International Conference on Consumer Electronics, 2005.. 2005 Digest of Technical Papers. vol. , Issue , Jan. 8-12, 2005 pp. 83-84.
Zomet, A., Levin, A., Peleg, S., and Weiss, Y., "Seamless image stitching by minimizing false edges," IEEE Transactions on Image Processing vol. 15, No. 4, Apr. 2006, 969-977.
Zhang , Mingju; Zhang , Lei; Sun, Yanfeng; Feng,Lin; Ma Weiying; "Auto cropping for digital photographs," IEEE International Conference on Multimedia and Expo, 2005, Publication Date: Jul. 6-8, 2005.
Andreadis, I. Amanatiadis, A.; "Digital Image Scaling," Proceedings of the IEEE Instrumentation and Measurement Technology Conference, 2005, May 16-19, 2005, vol. 3, pp. 2028-2032.
U.S. Appl. No. 12/184,019, filed Jul. 31, 2008.
U.S. Appl. No. 12/183,986, filed Jul. 31, 2008.
U.S. Appl. No. 12/183,997, filed Jul. 31, 2008.
U.S. Appl. No. 12/183,974, filed Jul. 31, 2008.
U.S. Appl. No. 12/183,960, filed Jul. 31, 2008.
U.S. Appl. No. 12/18,942, filed Jul. 31, 2008.
U.S. Appl. No. 12/184,071, filed Jul. 31, 2008.
U.S. Appl. No. 12/184,039, filed Jul. 31, 2008.
U.S. Appl. No. 12/184,060, filed Jul. 31, 2008.

(56) References Cited

OTHER PUBLICATIONS

Rubinstein, et al., "Improved Seam Carving for Video Retargeting," ACM Transactions on Graphics, vol. 27, No. 3, Art. 16, Aug. 2008, pp. 16-1 to 16-10.
Wang, et al. "Optimized Scale-and-Stretch for Image Resizing," ACM Transactions on Graphics, vol. 27, No. 5, Art. 118, Dec. 2008, pp. 118-1 to 118-8.
U.S. Appl. No. 12/200,637, filed Aug. 28, 2008, Adobe Systems Incorporated, all pages.
U.S. Appl. No. 12/250,406, filed Oct. 31, 2008, Adobe Systems Incorporated, all pages.
Michael J. Jones, James M. Rehg., "Statistical Color Models with Application to Skin Detection," International Journal of Computer Vision, 46, 1, Jan. 2002, pp. 81-96.
U.S. Appl. No. 12/469,486, filed May 20, 2009, Adobe Systems Incorporated, all pages.
U.S. Appl. No. 12/469,508, filed May 20, 2009, Adobe Systems Incorporated, all pages.
U.S. Appl. No. 12/551,178, filed Aug. 31, 2009, Adobe Systems Incorporated, all pages.
Hwang and Chien, "Content-Aware Image Resizing Using Perceptual Seam Carving with Human Attention Model," 2008 IEEE International Conference on Multimedia and Exp, Apr. 26, 2008, all pages.
Santella et al., 2006. Gaze-based interaction for semiautomatic photo cropping. ACM Human Factors in Computing Systems (CHI), pp. 771-780.
Jacob Stultz, Seam Carving: Parallizing a Novel New Image Resizing Algorithm, May 16, 2008, all pages.
Vladimir Vezhnevets, Vassili Sazonov and Alla Andreeva, "A Survey on Pixel-Based Skin Color Detection Techniques," Proc. Graphicon—2003, pp. 85-92, Moscow, Russia, Sep. 2003.
"Final Office Action", U.S. Appl. No. 12/469,508, (Jul. 10, 2012), 15 pages.
"Non-Final Office Action", U.S. Appl. No. 12/469,486, (Jun. 7, 2012), 14 pages.
"Non-Final Office Action", U.S. Appl. No. 12/469,508, (Feb. 22, 2012), 13 pages.
"Notice of Allowance", U.S. Appl. No. 12/469,508, (Sep. 18, 2012), 8 pages.
"Restriction Requirement", U.S. Appl. No. 12/469,508, (Nov. 3, 2011), 6 pages.
"Final Office Action", U.S. Appl. No. 12/200,637, (Oct. 25, 2012), 23 pages.
"Final Office Action", U.S. Appl. No. 12/469,486, (Nov. 13, 2012), 30 pages.
"Getting to Know Quick Masks in Photoshop CS2", Retrieved from <http://web.archive.org/web/20120702161206/http://www.dummies.com/how-to/content/getting-to-know-quick-masks-in-photoshop-cs2.html> on Feb. 6, 2013, (Dec. 5, 2008), 2 pages.
"Non-Final Office Action", U.S. Appl. No. 12/200,637, Apr. 12, 2012, 24 pages.
"Non-Final Office Action", U.S. Appl. No. 12/551,178, Feb. 14, 2013, 14 pages.
"Notice of Allowance", U.S. Appl. No. 12/200,476, Nov. 26, 2012, 9 pages.
"Restriction Requirement", U.S. Appl. No. 12/200,637, Dec. 6, 2011, 5 pages.
"U.S. Application as Filed", U.S. Appl. No. 12/251,163, filed Oct. 14, 2008, 69 pages.
"U.S. Application as Filed", U.S. Appl. No. 12/551,178, filed Aug. 31, 2009, 65 pages.
"US Application as Filed", U.S. Appl. No. 12/197,912, filed Aug. 25, 2008, 42 pages.
"US Application as Filed", U.S. Appl. No. 12/197,913, filed Aug. 25, 2008, 44 pages.
Lee, et al., "Fast Seam Carving Using Partial Update and Divide and Conquer Method", *Signal Processing and Information Technology (ISSPIT)*, 2009, p. 107-112., (2009), 1 page.
Rudy, Gabe "Seam-carving-gui A GUI for Content Aware Image Resizing (Retargeting, Seam Carving)", Retrieved from <http://code.google.com/p/seam-carving-gui/> on Apr. 4, 2012., 3 pages.
Simakov, Denis et al., "Summarizing Visual Data Using Bidirectional Similarity", *In Proceedings of CVPR 2008*, (Jun. 23, 2008), 8 pages.
Vaquero, et al., "A survery of image retargeting techniques", *Nokia Research Center*, p. 1-15, 15 pages.
Wang, et al., "Stimultaneous Matting and Compositing", *Microsoft Research Technical Report*, MSR-TR 2006-63 (May)., (2006), 8 pages.
Wolf, et al., "Non-homogeneous Content-driven Video-retargeting", *Proceedings of the 11th IEEE International Conference on Computer Vision*, (Oct. 14, 2007), pp. 1-7.
"Non-Final Office Action", U.S. Appl. No. 12/200,637, (Jun. 10, 2013), 28 pages.
"Final Office Action", U.S. Appl. No. 12/551,178, (Jul. 9, 2013), 24 pages.
Walles, Hayden "The Seamstress Library", Retrieved from <http://seam-carver.sourceforge.net/seamstress.pdf>, (Oct. 6, 2007), 21 pages.
"Notice of Allowance", U.S. Appl. No. 12/200,637, (Sep. 3, 2013), 8 pages.

\* cited by examiner

SEAM-BASED REDUCTION AND EXPANSION OF IMAGES USING PARTIAL SOLUTION MATRIX DEPENDENT ON DYNAMIC PROGRAMMING ACCESS PATTERN

BACKGROUND

Description of the Related Art

The diversity and versatility of display devices today imposes new demands on digital media. For instance, designers must create different alternatives for web-content and design different layouts for different devices. Moreover, HTML, as well as other standards, can support dynamic changes of page layout and text. Images, although they make up some of the key elements in digital media, typically remain rigid in size and cannot deform to fit different layouts automatically. However, the size and/or aspect ratio of an image must change in order to fit into different displays, such as cell phones or PDAs, or to print on a given paper size or at a specified resolution.

Resizing images using standard image scaling is often not sufficient since it is oblivious to the image content and typically can be applied only uniformly, resulting in various artifacts or distortions of the input image. Cropping is also of limited use since it can only remove pixels from the image periphery. More effective resizing can only be achieved by considering the image content and not only geometric constraints. Seam carving techniques have been developed which alter the dimensions of an image by removing pixels from the image or adding pixels to the image that are considered to be less important than other pixels of the image, e.g., based on a pixel's value as compared to the value of its neighbors. However, standard seam carving techniques may be computationally expensive and may also produce undesirable artifacts or distortions. In addition, the number of computations performed using standard seam carving techniques may make them too slow for use in fluid user-interactive environments.

SUMMARY

Systems, methods, and computer-readable storage media for resizing images using seam carving techniques may include generation of a partial solution matrix by at least partially isolating dependencies between sub-problems of a dynamic programming problem corresponding to its solution within different regions of an input image. Multiple isolated and/or partially isolated sub-problems may be processed independently and in parallel on respective processor core(s), or threads thereof, to generate a partial solution for each sub-problem when any partial solutions on which they depend have already been generated.

In various embodiments, as the partial solutions are generated for each sub-problem, they may be stored in a partial solution matrix for later use. The partial solution matrix may then be accessed to identify the lowest-cost seam of the input image. The number and/or shape of the isolated (or partially isolated) sub-problems may be dependent on the access pattern used by a dynamic programming operation to identify seams in the input image. For example, in one embodiment, isolated or partially isolated triangles may be processed to generate the partial solution matrix. In another embodiment, partially isolated parallelograms may be processed to generate the partial solution matrix.

In some embodiments, the methods described herein may include generating an energy map for an input image by determining a respective energy value for each pixel of the image. In various embodiments, the respective energy values may be computed as a difference in color values of two or more pixels, a difference in intensity values of two or more pixels, a derivative of two or more pixel values, an average of two or more pixel values, a maximum of two or more pixel values, or a minimum of two or more pixel values.

The methods may also include identifying seams of the input image having the lowest costs, dependent on the respective energy values of pixels of the seam, where the cost of each seam is dependent on a sum of the respective energy values of all pixels of the seam, an average of the respective energy values of all pixels of the seam, a weighted average of the respective energy values of all pixels of the seam, or a maximum value of the respective energy values of all pixels of the seam, for example. Identifying the lowest cost seams may in some embodiments include identifying the shortest paths across the image or applying a dynamic programming technique. The dynamic programming problem may be broken into isolated and/or partially isolated sub-problems for independent and concurrent processing, as described above.

In some embodiments, the methods described herein may be used to pre-compute a retargeting matrix, which may then be used in performing one or more retargeting operations on an input image without re-computing the energy and/or the lowest cost seam(s) of the image between iterations. In various embodiments, the retargeting matrix may store, for each seam, an identifier of the seam, an indication of the seam cost, a cost order of the seam, and/or an identifier of each of the pixels of the seam. In other embodiments, the retargeting matrix may store, for each pixel, an identifier of a horizontal or a vertical seam of which it is a part, and a cost of the seam(s) of which it is a part.

The methods may include performing a resizing operation on the image along one or more low cost seams, thus retargeting the image for display using a different size and/or aspect ratio. For example, the resizing operation may be a reduction operation, and the pixels of the identified seam(s) may be removed. In another example, the resizing operation may be an expansion operation, and the pixels of the identified seam(s) may be replicated in the image. The retargeting operation may be configured to identify and remove or replicate identified pixels by parallel processing each of a plurality of sub-matrices corresponding to strips of the image, e.g., by searching each sub-matrix for pixels associated with an indication of the lowest-cost seam or seams, and removing or replicating them in the image to produce a resized image.

The methods described herein may be implemented as program instructions, (e.g., stored on computer-readable storage media) executable by a CPU and/or GPU configured for parallel processing, in various embodiments. For example, they may be implemented as program instructions that, when executed, implement generating a retargeting matrix and/or performing a seam carving operation using parallel processing of sub-matrices thereof as stand-alone operations or in conjunction with execution of an image editing operation in a graphics application, in different embodiments.

Figure 1A:
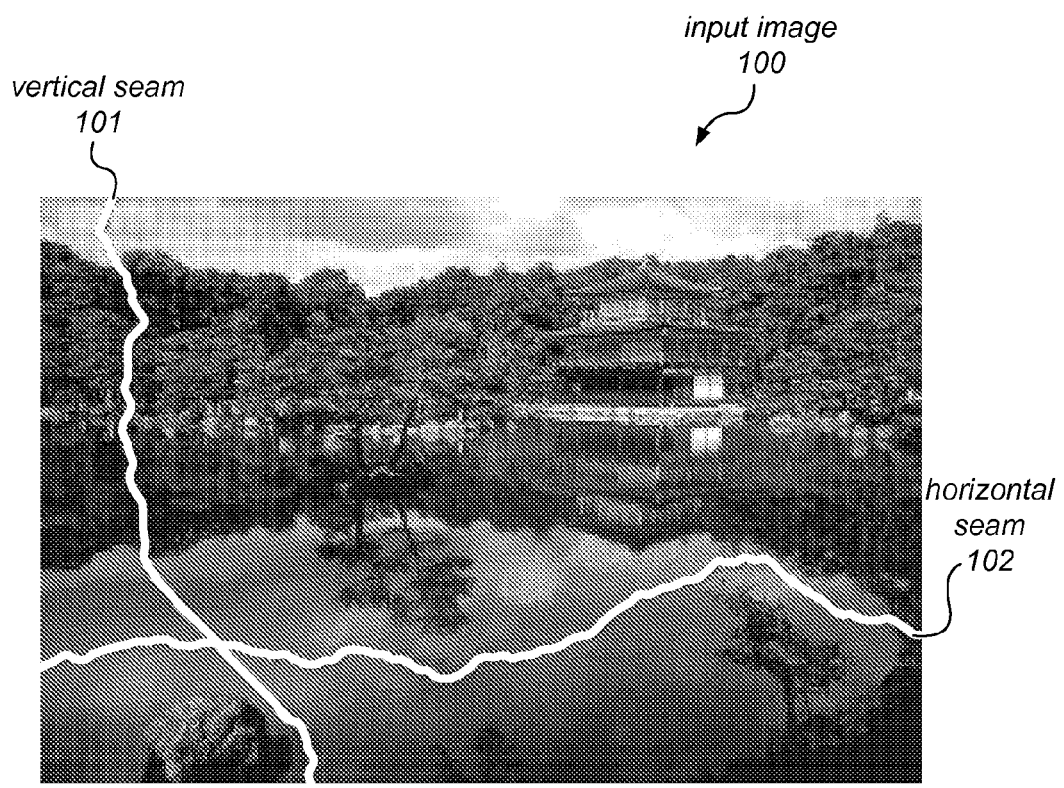
FIG. 1A illustrates two seams of an input image to be resized, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Graphic applications include an ever-increasing number of image editing features, such as various filtering options and resizing operations (e.g., for cropping, expanding, or reducing an image). Currently available image resizing techniques include scaling techniques and seam-based techniques, also known as seam carving techniques. Seam carving, as described herein, may be used to increase or decrease the size of an image, in various embodiments. For example, given an image, to reduce the width, one or more seams in the image may be identified by a seam carving technique and removed from the image, while to increase the width one or more seams may be identified and replicated in the image. As used herein, the term "seam" refers to a set of pixels along a path from one edge of the image (e.g., the top of the image) to the opposite edge of the image (e.g., the bottom of the image) that satisfies the following two constraints:

1) The seam is monotonic, meaning (in this example) that its path only goes in one direction across the image (e.g., down), and does not reverse directions as it crosses the image (e.g., going down for a while and then up, or vice versa).

2) The seam comprises pixels that are "connected" to each other. In other words, for any given pixel of the seam (in this example), the pixel on the next row must be either directly below the given pixel or diagonally adjacent to the given pixel (e.g., one pixel to the left of the pixel or one pixel to the right of the given pixel on the next row). For example, from any given pixel of the seam to the next pixel of the seam, the path cannot jump to a pixel 20 pixels away in the next row.

In various embodiments, seam carving techniques may be content sensitive, or context aware. For example, given an input image, the data representing the image may be processed to generate an alternate representation of the image, which may be referred to as an energy map, which indicates the importance of each pixel in terms of image resizing. In some embodiments of a content-aware seam carving technique, the values mapped to each pixel of the input image by this energy map may be generated dependent on the pixels in its neighborhood, e.g., using a derivative function. For, example, if a white pixel is surrounded by other white pixels, it may not be considered an important pixel (with respect to a resizing operation). This is because if it is removed, it is not likely to be missed. On the other hand, if a white pixel is surrounded by black pixels, then removing it may be very noticeable and may change the content of the image. Therefore, this pixel may be mapped to a higher value by the energy map.

A content-aware seam carving technique may in various embodiments assign an energy or weight to every pixel, and may use those values to identify one or more seams having a minimal cost with respect to a resizing operation. In other words, the content-aware seam carving technique may use the energy costs of each pixel to identify a path of pixels going from one edge of the image to the opposite edge of the image for which the sum of the energy values has the minimum value. In some embodiments, this determination may be solved efficiently using a technique called dynamic programming or shortest path. Once the lowest-cost seam has been identified, the image may be resized along the seam. For example, if the resizing operation is a reduction operation, the pixels associated with the lowest-cost seam may be removed. In this example, the seam carving operation would remove one pixel per row (because the seam is monotonic), and all the pixels to the right of the seam would be moved one pixel to the left to obtain an image that is one pixel narrower than the input image. By iteratively applying this technique, the image may be reduced to reach a target size and/or aspect ratio. Similarly, if the resizing operation is an expansion operation, the pixels associated with the lowest-cost seam may be replicated, and a copy of each pixel may be inserted into the image to the right of the seam. In this example, the seam carving operation would add one pixel per row, and all the pixels to the right of the seam would be moved one pixel to the right to obtain an image that is one pixel wider than the input image. By iteratively applying this technique, the image may be expanded to reach a target size and/or aspect ratio.

Figure 1B:
FIG. 1B illustrates an output image after resizing, according to one embodiment.

Seam carving may be further illustrated by way of example in FIGS. 1A and 1B. FIG. 1A illustrates an input image 100, which is to be resized. In this example FIG. 1A is to be resized to a target size with an aspect ratio that is shorter (i.e., smaller in the vertical dimension) and wider (i.e., longer in the horizontal dimension) than input image 100. In this example, seam carving techniques may be applied separately in each dimension.

To expand the width of input image 100, one or more low-cost (or lowest-cost) seams of pixels going from top to bottom, such as vertical seam 101, are identified. Input image 100 may then be expanded by replicating the pixels of each of the identified vertical seams (e.g., by making a copy of each pixel of the seam and inserting it into the image to the right of the seam). This may produce a resized image as an intermediate result, in some embodiments. To reduce the height of the input image, one or more low-cost (or lowest-cost) horizontal seams, such as horizontal seam 102, are identified. The resized input image 100 may then be reduced by removing the pixels of the identified horizontal seams. An output image 110, resulting from these two resizing operations, is illustrated in FIG. 1B. Note that in various embodiments, the reduction operation may be performed before the expansion operation, the reduction and expansion operations may be performed in parallel, or the resizing operation may alternate between the replication of vertical seams (e.g., one at a time) and the removal of horizontal seams (e.g., one at a time) until the target size and/or aspect ratio for the output image is reached.

As previously noted, standard seam carving techniques may be too slow for today's demanding interactive environment. One of the bottlenecks in seam carving may be the re-computation of energy values for all of the pixels of an input image between iterations in a given seam carving operation. Using standard seam carving techniques, these computations may comprise on the order of 25% of the computational bandwidth of the operation. For example, as described above, seam carving may include determining an energy value or weight associated with each pixel of an input image that is to be resized. Using standard seam carving techniques, the energy values for all the pixels of an image may be recalculated between iterations (e.g., after each removal or replication of a single seam). In this way, determining the next lowest cost seam in the image would take into account the change made in the previous iteration. For example, a standard seam carving technique may include the following steps:

Let the source image be S
For every seam to be computed:
1) Find energy (E) for all pixels of S
2) Use dynamic programming to find the optimal seam
3) Remove the pixels from S belonging to the seam
4) Repeat as necessary for the modified source image S Computing (and re-computing) energy over the entire image, especially for large images, can be highly computationally complex and expensive. In some embodiments, this complexity and expense may be greatly reduced by re-computing energy for only a portion of the image between iterations, rather than re-computing the energy of the entire image. For example, energy may only need to be re-computed in the neighborhood of a removed seam, since energy in the rest of the image may not have been affected by its removal. As a result, instead of computing energy over and over again, the method may include computing energy for the entire image once, and then updating the energy between seam carving iterations only where necessary. Using the example illustrated in FIGS. 1A and 1B, in some embodiments, before determining a next lowest cost vertical seam and/or a next lowest cost horizontal seam after removal of seams 101 and/or 102, only the energy values corresponding to the pixels in the neighborhood of these seams may be re-computed, rather than all of the energy values for input image 100. In this way, a large percentage of the computations typically performed in a seam carving operation may be avoided without compromising the quality of the result.

The neighbors of the pixels of an identified seam, i.e., those pixels for which the energy may be affected by seam removal and/or replication, may in general be dependent on the method used to determine the energy of the image. For example, in various embodiments, energy values mapped to each pixel may be computed as a difference in color values between two or more neighboring pixels, a difference in intensity values between two or more neighboring pixels, a derivative of two or more neighbors' pixel values, an average of two or more neighbors' pixel values, a maximum of two or more neighbors' pixel values, and a minimum of two or more neighbors' pixel values. The neighboring pixels for each of these energy functions may be of various orientations with respect to the target pixel, in different embodiments. For example, one energy function may compute an average of pixel values in a 3×3 pixel area having the target pixel at its center. Another energy function may compute the difference between the value of the pixel on the right of the target pixel and the value of the pixel on the left of the target pixel. Other energy functions are possible and may involve neighboring pixels of any number and/or orientation, in different embodiments.

In one example, neighbors of the identified seam pixels may include a small number of pixels on either side of each seam. In this example, the energy of the image may be computed using a gradient function involving one or more pixels immediately adjacent to each pixel (e.g., pixels that are one pixel to the right, left, top, and/or bottom of each pixel). Therefore, only the energies of the pixels immediately adjacent to each pixel of a replicated or removed seam may need to be re-computed and/or updated in an energy map for the image between iterations.

In some embodiments, the pixels that are considered neighbors of identified seam pixels may be determined programmatically, e.g., based on the energy function employed in the seam carving operation. In other embodiments, they may be determined arbitrarily, or using a default definition. In other words, in some embodiments, the neighborhood of a pixel may be defined to include pixels in a specified number of rows and/or columns surrounding the pixel. For example, in one embodiment, the energy may be re-computed and updated in the image's energy map for all pixels within 4 pixels of an identified seam pixel. In some embodiments, the number and/or orientation of pixels to be re-computed and/or updated may be configurable by a user (e.g., through a graphical user interface).

The methods described above may in some embodiments simplify and/or reduce the number of computations performed during the energy mapping portion of a seam carving operation, thus contributing to implementations of seam carving having improved performance over those employing standard seam carving techniques.

Another of the performance bottlenecks in a seam carving operation may be the retargeting of the image following identification of one or more low-cost (or lowest-cost) seams. For example, many of the images processed by graphic applications are represented by very large amounts of data, e.g., greater than 20 MB (often on the order of 1 GB). As a result, retargeting of such an image (i.e., removal and/or replication of one or more low-costs seams of the image data) may be extremely slow if run sequentially. The methods described herein may in some embodiments improve the speed at which retargeting may be performed during seam carving operations, therefore facilitating implementations of seam carving that are fast enough for user-interactive environments without compromising quality. In some embodiments, performance of seam carving operations may be improved by pre-computing a retargeting matrix mapping each pixel of an input image to a corresponding ordered seam. The retargeting matrix may then be divided into strips in the direction of the desired seam carving operation (e.g., horizontal or vertical strips). Each strip may be processed independently and concurrently (i.e., in parallel) on one or more processors or on a multithreaded processor to retarget the input image.

Figure 2:
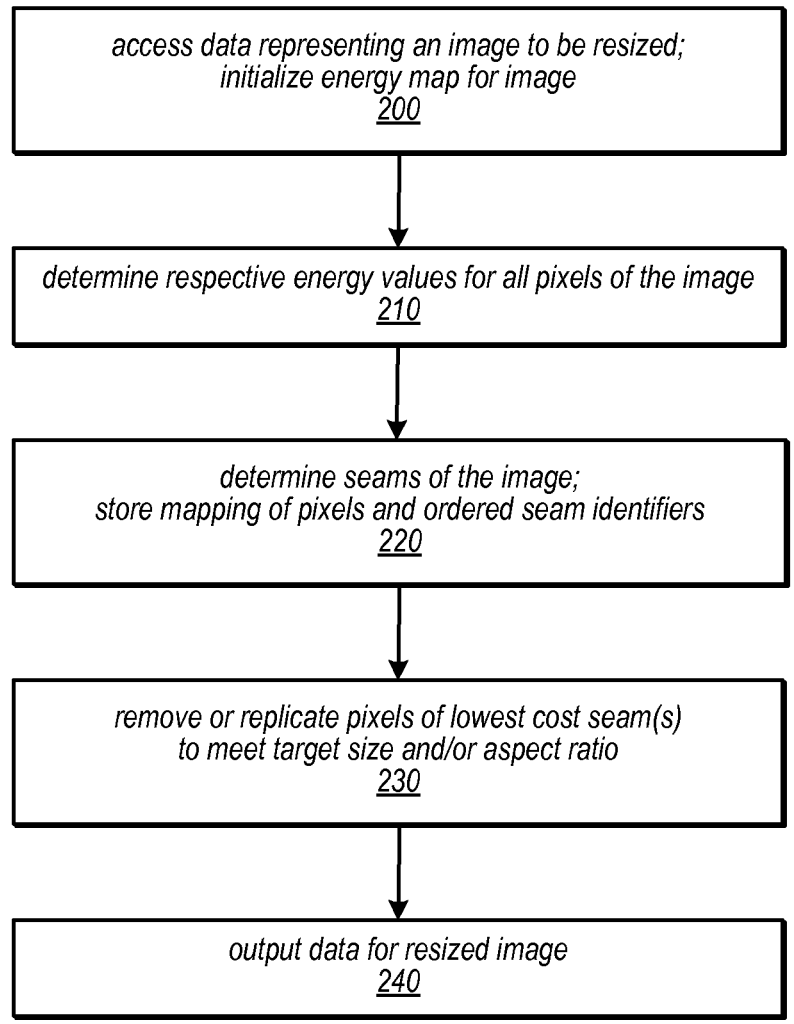
FIG. 2 is a flow diagram illustrating a method for resizing images along seams, according to various embodiments.

One method for seam carving that employs a retargeting matrix, as described herein, is illustrated by the flow chart in FIG. 2. In this example, data representing an image to be resized is accessed, as in 200. This data may be accessed in response to being imported into an application configured for image editing, or may be resident in memory accessible to such an application as a result of being imported previously, or as a result of being created and/or modified by the application prior to the desired resizing operation. Note that, as used herein, the term "image editing application" may refer to a graphic application that is specifically directed to image editing, or to any application that includes an image editing component, according to various embodiments. The data accessed may represent a whole image or a portion of an image that is to be resized, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments. As shown at 200 of FIG. 2, the method may also include initializing an energy map for the image. For example, memory may be allocated for storing the energy values of all the pixels of the input image. In various embodiments, other data structures (e.g., data structures configured to store input image data, intermediate image data, and/or output data for resized images) may also be allocated in memory (not shown).

In this example, respective energy values may be determined for all of the pixels of image, as in 210. The energy values may be determined as described above (e.g., using a derivative function or another parametric function), or by any of various other methods. Dependent on these energy values, the lowest cost seam of the image may be determined, as in 220. The cost of each seam may be determined in various ways in different embodiments, such as by calculating a sum, average, or weighted average of the energy values of the pixels making up the seam. In another example, the cost of each seam may be dependent on a maximum energy value for the pixels of the seam. In other words, a seam may be assigned a higher cost due to the presence of even one high-energy pixel in the seam, because removing that pixel may create an undesirable visual artifact. As previously noted, identifying a seam of the image having a lowest cost may include identifying a shortest path across the image or applying a dynamic programming technique, in some embodiments.

Figure 3:
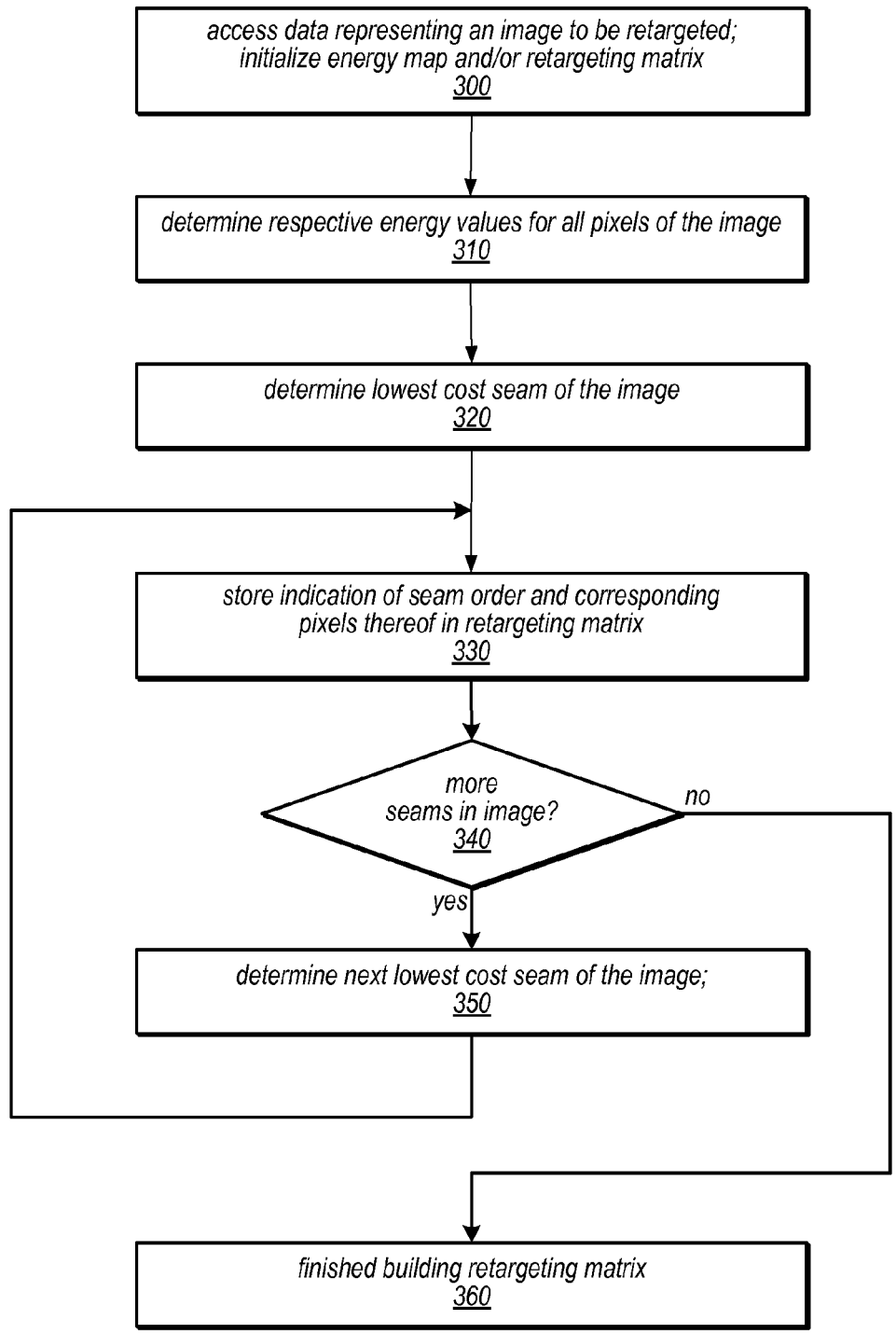
FIG. 3 is a flow diagram illustrating a method for generating a retargeting matrix for use in subsequent image retargeting operations, according to one embodiment.

As illustrated at 220 in FIG. 2, the method may include storing a mapping of pixels and ordered seam identifiers, which may be referred to herein as a retargeting matrix. In one embodiment, as each low-cost seam is recognized, an identifier of that seam may be associated with each of the pixels of the seam and/or may be stored in a data structure mapping each pixel of the seam with the seam identifier. Note that each pixel of an image may be associated with a vertical seam and/or with a horizontal seam of which it is a part. For example, each pixel may be associated with one value representing the cost order of the horizontal seam of which it is a part when all the horizontal seams of the image are ordered by cost. Each pixel may also be associated with another value representing the cost order of the vertical seam of which it is a part when all the vertical seams of the image are ordered by cost. One method for generating such a data structure is illustrated in FIG. 3 and described in more detail below.

As illustrated at 230 in FIG. 2, the method may include resizing the image along one or more seams determined to have the lowest cost. For example, if the image is to be reduced, the pixels of one or more of the lowest-cost seams may be removed, while if the image is to be expanded, the pixels of one or more of the lowest-cost seams may be replicated and inserted adjacent to the identified seam(s).

Note that in some embodiments, removal and/or replication of seams may be performed in an iterative manner until a resizing target is achieved (not shown). For example, in one embodiment, a first seam (i.e., the lowest cost seam) may be removed or replicated, but this does not result in a resized image that meets a given resizing target (e.g., a target for size, percentage increase/decrease, and/or aspect ratio). In such embodiments, additional seams (i.e., pixels of successively higher cost seams, according to the stored mapping described above) may be removed or replicated one at a time until the resizing target for the image is met. In another embodiment, the retargeting operation may include a determination of the number of seams that should be removed or replicated in the horizontal and/or vertical directions to achieve the resizing target prior to removing or replicating any of them. In such embodiments, the stored mapping of pixels and corresponding seams (in cost order) may be accessed to determine which pixels of each row and/or column of the image should be removed or replicated by the retargeting operation prior to removing or replicating any of them.

Once the resizing operation is complete, the method may include outputting data representing the resized image, as in 240. For example, the data may be provided to a display component of the application for display of the resized image to the user and/or the data may be stored as in intermediate image by the image editing application for further processing by the application (or another application) or as a final image (e.g., written to main memory, a file, an archive, etc.). Note that the method illustrated in FIG. 2 may in various embodiments be applied to reduction of an image, expansion of an image, or a combination of reduction and expansion operations in order to resize the image to its target size and/or aspect ratio (as in FIGS. 1A-1B).

The methods described herein for iteratively determining the lowest cost seam in an image between seam carving iterations may in some embodiments be applied independently from the performance of seam carving operations themselves. As noted above, rather than iteratively calculating the lowest-cost seam and duplicating it (e.g., one seam at a time) during an expansion operation, the method may include pre-computing the cost of all seams up front, and then duplicating one or more of the lowest-cost seams until a resizing target is met. Similarly, a retargeting operation that reduces an image, or that allows a user to interactively resize an image (e.g., by stretching or moving an edge or corner of the image through a graphical user interface), may access a pre-computed retargeting matrix to determine one or more seams to be removed and/or replicated without having to iteratively determine the next lowest cost seam(s) as the image is modified.

As noted above, a standard seam carving technique may include the following steps:

Let the source image be S

For every seam to be computed:
1) Find energy (E) for all pixels of S
2) Use dynamic programming to find the optimal seam
3) Remove the pixels from S belonging to the seam
4) Repeat as necessary for the modified source image S In some embodiments, a method for generating a retargeting matrix may include steps 1 and 2, but may not include removing the pixels of each identified seam from the actual image data, as shown in step 3. Instead, the method may include repeating steps 1 and 2 as if the seam identified in the previous step 2 had been removed, and determining the next lowest cost seam of the image from the updated energy map produced in the current step 1. As the next lowest cost seam is calculated, an indication of the seam cost, the cost order of the seam, and/or the pixels of the seam may be stored in a retargeting matrix for the image. In some embodiments, such a retargeting matrix may include all the information needed to perform interactive retargeting of images without re-computing the image energy and/or the lowest cost seam(s) during the retargeting operation. For example, as a user drags or stretches an edge or corner of an image, the image may be retargeted for display one or more times using the pre-computed retargeting matrix to determine which seam(s) to remove and/or replicate. Once the user saves the image, the retargeting matrix may be re-computed and/or stored in memory for subsequent retargeting operations. In some embodiments, generation of a retargeting matrix may be accelerated using the methods described above for accelerating seam carving operations. For example, when the energy computation at step 1 above is repeated, only the energy values for pixels in the neighborhood of the seam identified in the previous step 2 may be re-computed and updated in the energy map for the image. The updated energy map, with only these changes, may then be used to determine the next lowest seam cost in step 2.

One method for generating a retargeting matrix for use in subsequent image retargeting operations is illustrated in FIG. 3, according to one embodiment. In this example, data representing an image to be retargeted is accessed, as in 300. This data may be accessed in response to being imported into an application configured for image editing, or may be resident in memory accessible to such an application as a result of being imported previously, or as a result of being created and/or modified by the application prior to the desired resizing operation. Note that, as used herein, the term "image editing application" may refer to a graphic application that is specifically directed to image editing, or to any application that includes an image editing component, according to various embodiments. The data accessed may represent a whole image or a portion of an image that is to be resized, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments. As shown at 300 of FIG. 3, the method may also include initializing an energy map and/or a retargeting matrix for the image. For example, memory may be allocated for storing the energy values of all the pixels of the input image and/or for storing the retargeting matrix. In various embodiments, other data structures (e.g., data structures configured to store input image data, intermediate image data, and/or output data for retargeted images) may also be allocated in memory (not shown).

In this example, respective energy values may be determined for all of the pixels of image, as in 310. The energy values may be determined as described above (e.g., using a derivative function or another parametric function), or by any of various other methods. Dependent on these energy values, the lowest cost seam of the image in one direction (e.g. horizontal or vertical) may be determined, as in 320. The cost of each seam may be determined in various ways in different embodiments, such as by calculating a sum, average, or weighted average of the energy values of the pixels making up the seam. In another example, the cost of each seam may be dependent on a maximum energy value for the pixels of the seam. In other words, a seam may be assigned a higher cost due to the presence of even one high-energy pixel in the seam, because removing that pixel may create an undesirable visual artifact. As previously noted, identifying a seam of the image having a lowest cost may include identifying a shortest path across the image or applying a dynamic programming technique, in some embodiments.

As illustrated at 330 in FIG. 3, the method may include storing in a retargeting matrix an indication of the seam determined to have the lowest cost. For example, the retargeting matrix may be configured to store an identifier of the seam, an indication of the seam cost, the cost order of the seam, and/or an identifier of each of the pixels of the seam in a single entry in the matrix, in various embodiments. In another example, the retargeting matrix may include an entry for each pixel and each entry may include an identifier of a horizontal seam and/or an identifier of a vertical seam of which the pixel is a part. As described above, these identifiers may in some embodiments represent the ordinal number of the corresponding seams, i.e., their position when all seams of the image are ordered by increasing incremental cost, as described herein. In this example, the pixels of the lowest cost seam in this direction may be associated with a seam value of "1."

In the example illustrated in FIG. 3, if there are more seams in this direction in the image, shown as the positive exit from 340, the method may include determining the next lowest cost seam of the image in this direction, as in 350. The method may also include storing an indication of the next lowest cost seam in the retargeting matrix, shown as the feedback from 350 to 330. For example, each pixel in the second lowest-cost seam (in the current direction) may be associated with a seam value of "2" in a retargeting matrix, and so on. In various embodiments, the energy values of the all the pixels of the image, or of the pixels in the neighborhood of the lowest cost seam, may be updated (e.g., in the energy map for the image) prior to determining the next lowest cost seam (not shown). In such embodiments, once the energy map for the image has been updated, the determination of the next lowest cost seam may be dependent on the updated energy map. As described above, the neighborhood, and therefore the pixels for which the energy values are updated, may be dependent on the energy function employed by the particular seam carving technique to be used in a subsequent retargeting operation. In other embodiments, the energy map may not be updated prior to determining the next lowest cost seam. In such embodiments, the next lowest cost seam of the image may be determined based on the energy values determined for each pixel of the input image at 310, or may be determined based on what the energy values of the image would be if the lowest cost seam had been removed or replicated.

If there are no additional seams in this direction (e.g., horizontal or vertical), shown as the negative exit from 340, the retargeting matrix for this direction may be complete, as in 360. In some embodiments, all of the operations illustrated in 320-360 of FIG. 3 may be repeated (based on the original input image data and energy values determined at 310) to generate a retargeting matrix in the other direction. For example, if an input image is 400×600 pixels (e.g., if it includes 400 pixels in each row and 600 pixels in each column), the vertical seam value associated with each pixel on a given row may be between 1 and 400, depending on which of the 400 vertical seams, numbered in order of increasing incremental cost (as described above), includes the pixel. Similarly, the horizontal seam value associated with each pixel in a given column may be between 1 and 600, depending on which of the 600 horizontal seams, numbered in order of increasing incremental cost (as described above), includes the pixel. Note that in some embodiments, entries of a retargeting matrix may be indexed by their corresponding pixels' locations (e.g., by their associated pixels' row and/or column numbers), according to their position within the input image (i.e., prior to the resizing and/or retargeting operation). In this example, one entry of the retargeting matrix may correspond to a pixel that is a part of the lowest-cost horizontal seam and that is also a part of the third lowest-cost vertical seam. This entry may include a value of "1" in a field representing the horizontal seam order and a value of "3" in a field representing the vertical seam order associated with that pixel. The entry may be indexed according to the position of the corresponding pixel in the original image. For example, if this entry corresponds to the pixel on row 237 and in column 168 of the input image, it may be indexed as (237, 168) in a data structure representing a retargeting matrix for the input image.

The methods described herein may facilitate the efficient generation of a retargeting matrix, therefore allowing seam carving operations to be performed in user-interactive applications that exhibit acceptable performance (speed) and produce high quality results (e.g., retargeted images without undesirable artifacts or distortions). Note that in some embodiments, a retargeting matrix may be automatically generated in response to the invocation of an image editing operation. In other embodiments, a retargeting matrix may be automatically generated in response to an image being loaded into a graphics application, and/or in response to a modified version of an image being stored in memory (e.g., following execution of an image editing operation, or when a graphics application is being closed). In still other embodiments, a retargeting matrix may be pre-computed for an image and stored with the image (e.g. by a previous user of an image editing application, or by a third-party provider of the image) so that when the image is opened or otherwise accessed by a graphics application, the pre-computed retargeting matrix may be loaded into the application along with the image data for use in image editing operations.

As noted above, a standard seam carving technique may include the following steps:
  Let the source image be S
  For every seam to be computed:
    1) Find energy (E) for all pixels of S
    2) Use dynamic programming to find the optimal seam (e.g., to find the lowest cost seam)
    3) Remove the pixels from S belonging to the seam
    4) Repeat as necessary for the modified source image S In such a standard seam carving operation, the bulk of the work of the operation (perhaps on the order of 50-60%) may take place in step 2, in which dynamic programming is applied to find an optimal seam of the image. This step is shown in FIG. 2 at 220, and in FIG. 3 at 320 (as used in pre-computing a retargeting matrix). Dynamic programming, which has roots in graph theory, is a method of solving problems involving the use of an optimal substructure and the breaking down of the problem into overlapping sub-problems. Dynamic programming may applied to large problems whose solutions are dependent on the solution at each point in the problem space, which are in turn dependent on the solutions of other points in the same neighborhood. For example, dynamic programming may be applied to finding the shortest path, the minimum weight, or the minimum distance, given a large problem space having many potential solutions. Because the sub-problems within dynamic programming are overlapping, they do not naturally lend themselves to parallel execution (e.g., multithreading). For example, conventional dynamic programming techniques applied to seam carving may typically not be multithreaded in their original form. These techniques may operate on two things: the image data (e.g., assigned energy values) at a given location (e.g., for a given pixel) and the existing partial solution to the problem up to that point (e.g., an accumulated partial solution based on the solutions at pixels of a previously processed row of the image). In the context of seam carving, dynamic programming typically involves the application of a per-pixel, scan-line-at-a-time technique to reduce a very complex problem of finding the shortest path across an image (e.g., in terms of energy) into a simpler problem. As noted above, dynamic programming may be used to create a partial solution at each pixel and to accumulate these solutions in order to determine the final solution. The result of dynamic programming, in this context, may be the generation of a cost matrix of partial solutions, or of a matrix comprising the costs of various seams if they were to originate from each given pixel and monotonically travel in the desired direction. This partial solution matrix will contain the optimal seam because it contains all possible solutions to its identification. Therefore, the operations listed above may be described in more detail this way:
  Let the source image be S
    1) Find energy (E) for all pixels of S (or for a portion of the pixels, in iterations other than a first iteration)
    2) Use dynamic programming to generate a matrix (P) of partial solutions
    3) From P, identify the optimal seam (e.g., the lowest cost seam)
    4) Remove the pixels from S belonging to the identified seam
    5) Repeat 1-4, as necessary, to meet a resizing target for S Since dynamic programming operates on previously computed partial solutions (e.g., partial solutions corresponding to locations in the previous scan-line), any optimization thereof may be sensitive to how those partial solutions are accessed. For example, in some embodiments, pixels are processed from left to right in a scan-line. At each pixel, the access pattern may include several partial solutions corresponding to locations in the previous scan-line. For example, in various embodiments, the access pattern may include a set of partial solutions for locations in the set of locations ("north," "northwest," "northeast") of the current location, ("west," "northwest," "north") of the current location, or ("northwest," "north") of the current location. In some embodiments, and dependent on the particular access pattern used by a given dynamic programming technique, a dynamic programming operation for seam carving of an image may be divided into sub-problems based on regions that are isolated from each other with respect to the access pattern, and which may be processed by dynamic programming using multi-threading. In such embodiments, by recognizing the dependencies imposed by the access pattern of the particular dynamic programming algorithm being applied, a dependency diagram may be generated representing multiple, isolated problem spaces for which partial solutions may be calculated independently and in parallel on multiple processors or threads thereof. These partial solutions may in some embodiments be stored in a data structure representing a partial solution matrix, which may be subsequently accessed to determine the overall solution (e.g., identification of one or more low-cost seams of an image).

For example, at the heart of every iteration of seam detection is a dynamic programming algorithm which by its nature executes in $k*O(N^2)$, where $N^2$ is the number of pixels and k is the number of passes (usually 2). At every pixel, the algorithm may be dependent on the solutions at some of its neighbors (e.g., it may pick the extrema value among them), which in turn may be used to generate an accumulation buffer. In other words, to find the optimal seam through any pixel, dynamic programming may be used to find the neighbor of the pixel having the smallest energy, and to accumulate its partial solution into the partial solution at the current pixel. When applied to seam carving, a dynamic programming access pattern may, for example, examine the partial solutions of three neighbors of a given pixel. Traditionally, within dynamic programming, every pixel may be processed sequentially. In some embodiments, dependent on the neighbor access pattern of the algorithm, multiple isolated sub-problems may be identified, and the entire process may be multithreaded. In some embodiments, using K cores, the time spent in dynamic programming may be reduced to $O(N^2)/K$.

Figure 4:
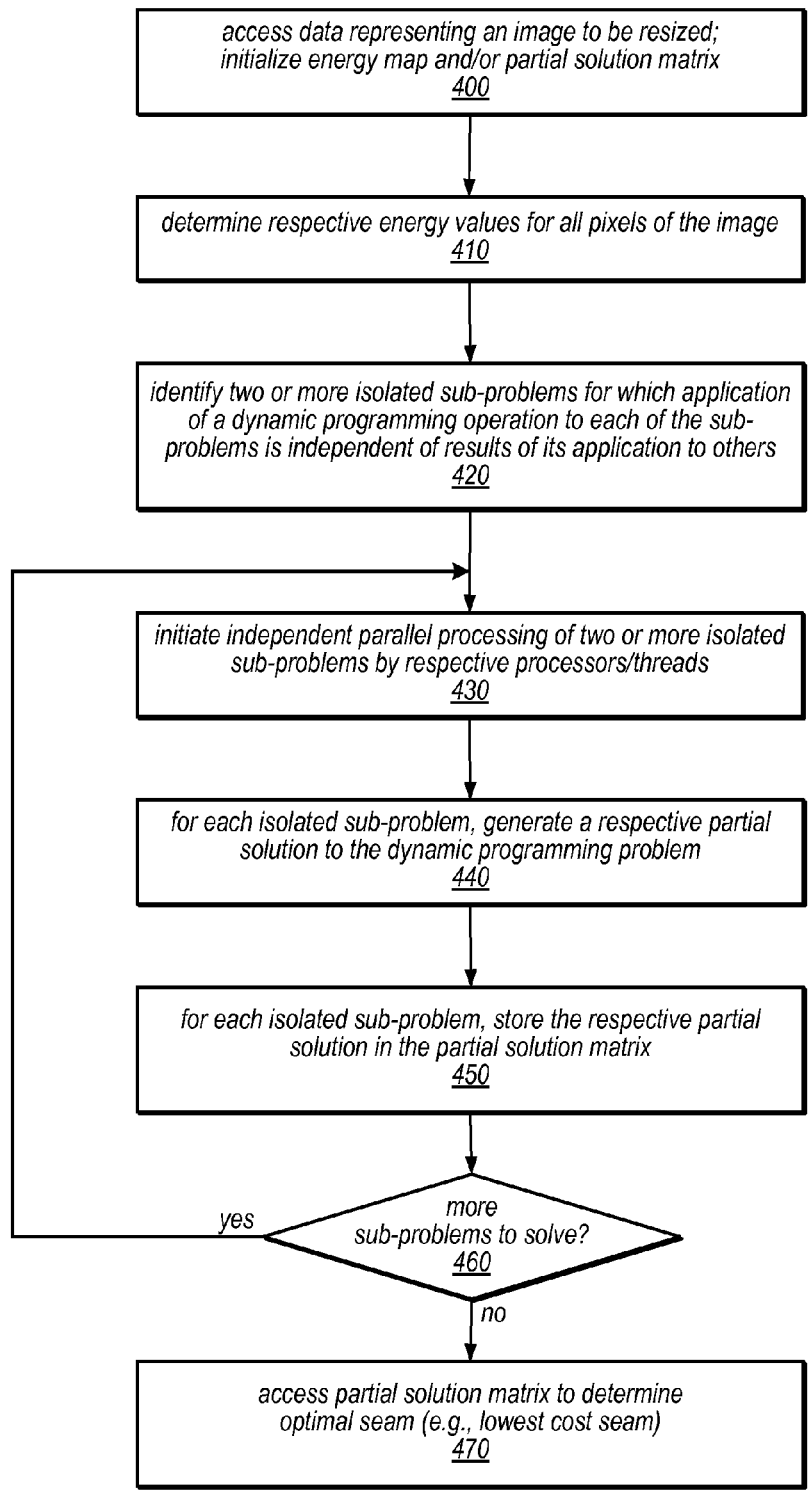
FIG. 4 is a flow diagram illustrating one embodiment of a method for isolating and processing sub-problems of a dynamic programming problem, as applied to seam carving.

One embodiment of a method for isolating and processing sub-problems within dynamic programming as applied to seam carving is illustrated in FIG. 4. In this example, dynamic programming may be used to identify the lowest-cost seam of an input image so that it may be removed as part of a seam carving operation. In this example, the method may include accessing data representing an image to be resized, as in 400. As in the previous examples, this data may be accessed in response to being imported into an application configured for image editing, or may be resident in memory accessible to such an application as a result of being imported previously, or as a result of being created and/or modified by the application prior to the desired resizing operation. As illustrated in FIG. 4, the method may also include initializing data structure for storing an energy map and/or a partial solution matrix for the image. As illustrated in FIG. 4, the method may include determining respective energy values for all pixels of the image, as in 410. As described above, these values may be dependent on values of pixels in the neighborhood of each pixel, and may stored in the energy map for use by the dynamic programming operation.

Figure 5A:
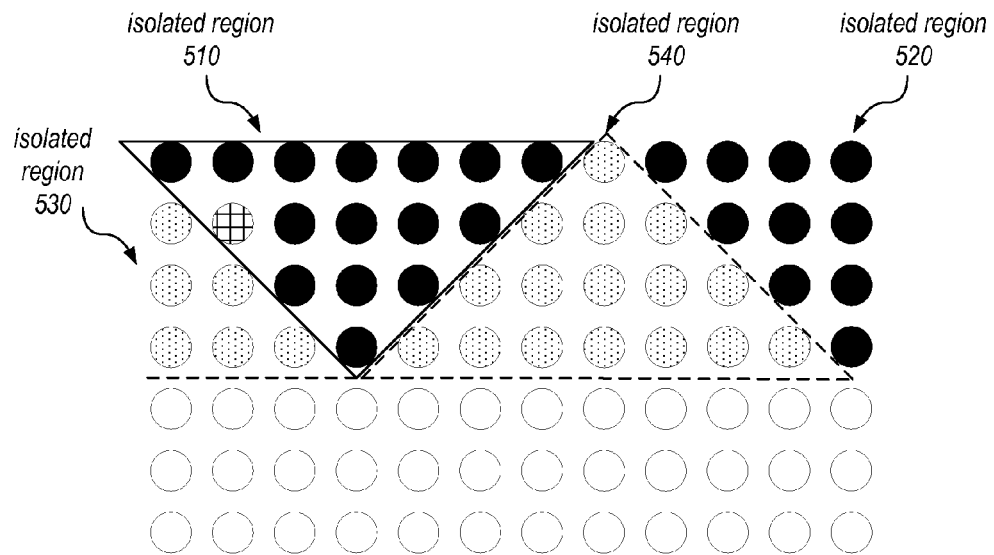
FIG. 5A illustrates a portion of a data structure on which a dynamic programming technique is to be applied, according to one embodiment.
Figure 5B:
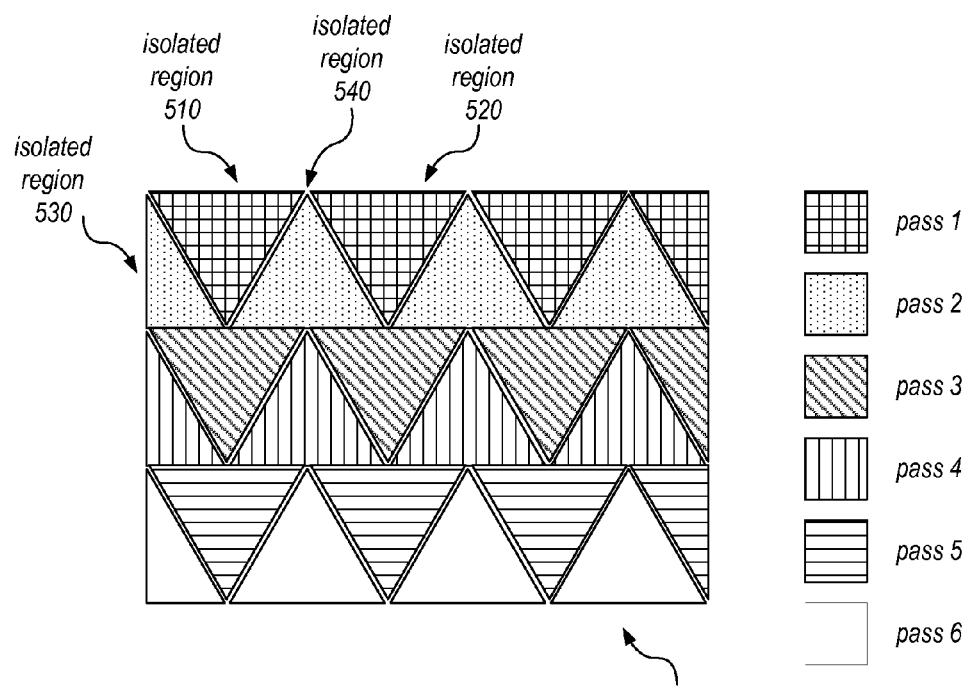
FIG. 5B illustrates a dependency diagram indicating dependencies in the application of dynamic programming to sub-problems of a dynamic programming problem for an image, according to one embodiment.
Figure 8:
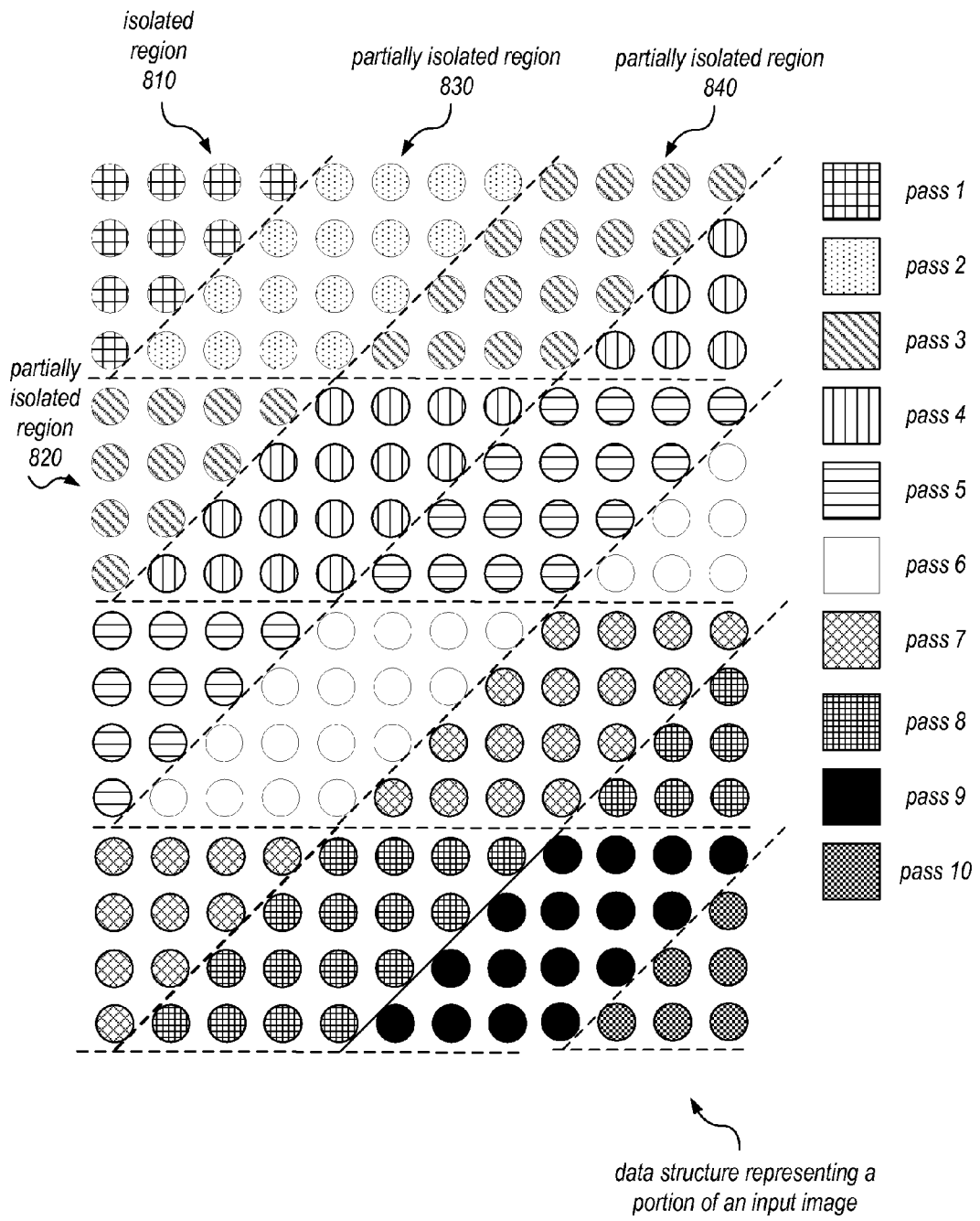
FIG. 8 illustrates a data structure representing a dependency diagram for an input image, according to one embodiment.

In the example illustrated in FIG. 4, the method may include identifying two or more isolated sub-problems of the dynamic programming problem for which partial results of a given dynamic programming operation (i.e. to each sub-problem) are not dependent on results of its application to other sub-problems, as in 420. In other words, the method may include determining dependencies imposed by the dynamic programming access pattern and may use those to identify isolated sub-problems within the overall seam identification problem. Examples of two such dependency patterns and isolated sub-problems are illustrated in FIGS. 5A, 5B, and 8, and described in more detail below.

As shown in FIG. 4, the method may include initiating independent parallel processing of two or more isolated sub-problems by respective processors, or by different threads of a multi-threaded multiprocessor, as in 430. Note that the number of sub-problems into which the dynamic programming problem may be divided may in some embodiments be dependent on a number of available processors (or threads thereof) in the execution environment. For example, in some embodiments, the number of sub-problems into which the dynamic programming problem is divided may be equal to, or a multiple of, the number of processors or threads available in the system. In other embodiments, the number of sub-problems into which a dynamic programming problem is divided may not be related to the number of available processors or threads, but may be determined arbitrarily or using other methods and/or criteria. However, the number of sub-problems that may be solved at one time may be dependent on the number of available processors or threads thereof. For example, in a system that includes 16 available threads, up to 16 isolated sub-problems may be solved in parallel on the 16 available threads. In another example, in a system that includes 4 available processors, the dynamic programming problem may be divided into 16 sub-problems, and four of these sub-problems may be processed at a time, followed by four more, and so on.

As illustrated in FIG. 4, the method may include, for each isolated sub-problem, generating a respective partial solution to the dynamic programming problem, as in 440, and storing it in the partial solution matrix (i.e. adding each of the partial solutions to the partial solution matrix), as in 450. If there are more sub-problems to solve, shown as the positive exit from 460, the method may include repeating the operations shown as 430-450 for additional isolated sub-problems. For example, if there are not enough processors or threads on which to solve all of the sub-problems identified as being isolated from each other in the first pass, one or more additional passes may be performed until all of the partial solutions have been generated and stored in the partial solution matrix.

Once all of the isolated sub-problems have been solved, shown as the negative exit from 460, the method may continue by accessing the partial solution matrix to determine the overall solution, i.e. the optimal (e.g., lowest-cost) seam of the image. This is shown as 470 in FIG. 4. In this example, this lowest-cost seam may be removed to reduce the size of the input image.

Note that while several examples described herein involve the identification of a lowest-cost vertical seam of an input image, the methods may also be applied to determining the lowest-cost horizontal seam of an input image. For example, the dynamic programming problem may be divided into isolated sub-problems dependent on an access pattern for determining the cost of a horizontal seam (which may be different from that used in determining the cost of a vertical seam). If the method illustrated in FIG. 4 were applied to the identification of the lowest-cost vertical seam, removal of the identified seam would reduce the image by one pixel in the horizontal direction. If the method were applied to the identification of the lowest-cost horizontal seam, removal of the identified seam would reduce the image by one pixel in the vertical direction. Note also that the method illustrated in FIG. 4 may be applied iteratively to identify additional low-cost seams, e.g., to further reduce the size of the input image in one or both dimensions, and/or to identify low-cost seams for replication (e.g., for expanding an input image in one or both dimensions), in various embodiments.

The method described herein for parallel processing of sub-problems of a dynamic programming problem may be further illustrated by way of example. FIG. 5A illustrates a portion of a data structure 550 on which a dynamic programming technique is to be applied. In this example, data structure 550 may represent a block of memory comprising image data and/or energy values for the pixels of an image, and dynamic programming may be applied to the data to identify various seams of the image (e.g., in cost order). In this example, the dynamic programming operation at each location (which may correspond to a pixel) may be dependent on the partial solutions previously determined for the locations on the previous row above the current location, to the right of the current location, and to the left of the current location. In other words, the access pattern used by the dynamic programming operation may include locations to the "northwest," "north," and "northeast" of the current location.

In this example, the top row of circles represents the top edge of an input image. Therefore, none of the partial solutions at these locations are dependent on those of any other locations (since there are no locations above them). Once the partial solutions have been generated and stored for these locations, they may be generated for some of the locations represented by the circles on the next row. For example, the location represented by the checkered circle within isolated region 510 may only be dependent on the partial solution for other locations within isolated region 510, since the locations on the previous row above, to the left, and to the right of this location are included in isolated region 510. Therefore, the partial solutions for this location may be generated once those of the first row within isolated region 510 have been generated. In this example, none of the partial solutions at any of the locations within isolated region 510 are dependent on those of any locations outside of isolated region 510. Therefore, dynamic programming may be applied independently and in parallel to the groups of locations represented by the black circles shown in FIG. 5A (e.g., to each of isolated regions 510 and 520).

In the example illustrated in FIG. 5A, the partial solutions for the locations represented by the dotted circles (e.g., in isolated regions 530 and 540) are dependent on some of the partial solutions generated at locations in isolated region 510 and/or isolated region 520. Therefore, once the partial solutions have been generated for all of the locations represented by isolated regions 510 and 520, the partial solutions for locations represented by isolated regions 530 and 540 may be generated, by applying dynamic programming independently and in parallel to the sub-problems represented thereby. This idea may in some embodiments be extended for application to multiple rows of such isolated regions of a dynamic programming problem, as illustrated in FIG. 5B.

In the example illustrated in FIG. 5B, the idea is to process sub-problems in triangles. FIG. 5B may be thought of as representing a dependency diagram (or an isolation diagram) for the dynamic programming access pattern described in the previous example. The dependency diagram illustrated in FIG. 5B assumes that four processor cores (or threads thereof) are available for generating partial solutions to the sub-problems of the dynamic programming problem for the given input image. Because there are four cores (or threads) available, each "row" of sub-problems is divided into four isolated bottom-up triangles (or portions of triangles) suitable for parallel processing and four bottom-down triangles for parallel processing. In this example, the access pattern dictates that the height of each triangle is approximately one-half its width. Therefore, the number of triangles on each row is dependent on the number of cores, the width of each triangle is dependent on the number of triangles, the height of each triangle is dependent on the width, and the number of rows (and processing passes) is dependent on the height of each row. As illustrated in FIG. 5B, on each of passes 1-6, partial solutions for four isolated sub-problems may be solved at the same time on respective ones of the four processor cores (or threads thereof). The order of execution, in this example, may be as follows:

1) Process all of the isolated regions represented by bottom-up triangles in the first row independently of each other, and store partial solutions in partial solution matrix.
2) Process all of the isolated regions represented by the bottom-down triangles in the first row independently of each other, and store partial solutions in partial solution matrix.
3) Repeat steps 1 and 2 for isolated regions on the second and third rows to complete the partial solution matrix.

Figure 6:
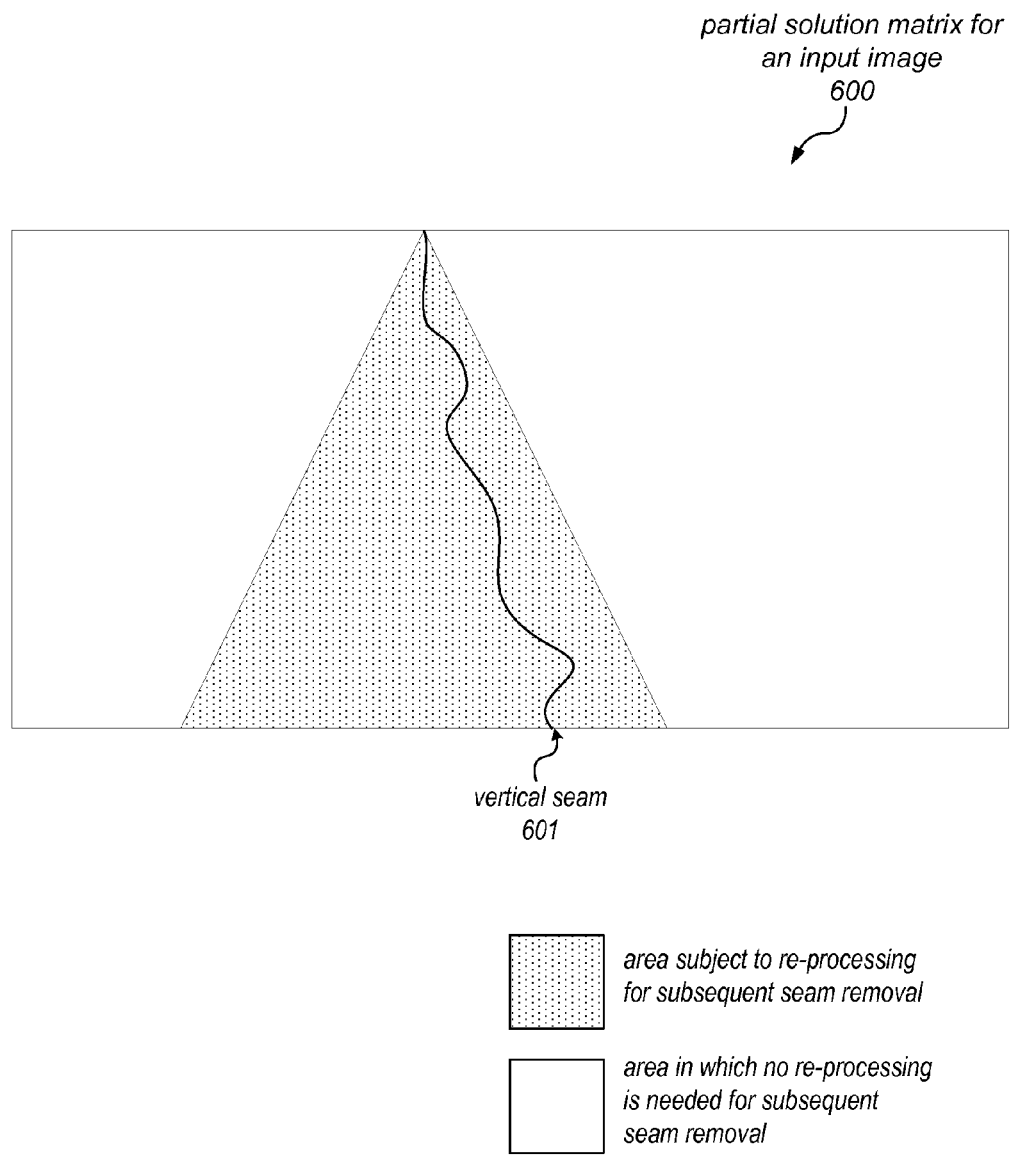
FIG. 6 illustrates the application of dynamic programming to a partial solution matrix for an input image, according to one embodiment.

Once a partial solution matrix has been generated, as described above, the partial solution matrix may be accessed to identify the lowest-cost seam of the image. For example, to determine the vertical seam with the lowest cost, the accumulated partial solutions for each pixel on the bottom edge of the partial solution matrix may be examined and the solution having the lowest cost may be identified. The seam corresponding to this partial solution would be the lowest-cost seam of the image. FIG. 6 illustrates the application of dynamic programming to a partial solution matrix for an input image 600. In this example, the dotted triangle may represent all of the possible seams from the point at the top of top of vertical seam 601 to the bottom edge of the matrix. Because seams are monotonic and connected, a seam that includes a pixel corresponding to the location at the top of this triangle will include a pixel corresponding to one of three possible locations in the second row, one of five possible locations the third row, and so on. In this example, dynamic programming has been used to identify vertical seam 601 as the lowest energy seam that includes the pixel represented by the top of the triangle. In other words, dynamic programming has been applied to identify the set of connected pixels (one on each row) for which the accumulated partial solutions (e.g., the accumulated costs) of the pixels has the minimum value (e.g., the lowest cost).

As described herein, in an image editing operation (e.g., a resizing operation) in which multiple low-cost seams are to be removed or replicated, dynamic programming may be applied multiple times, to find the next lowest-cost seam on each iteration. As illustrated in FIG. 6, when a lowest-cost seam is removed (e.g., vertical seam 601), it may not be necessary to re-generate the entire partial solution matrix in order to find the next lowest cost seam. In the example illustrated in FIG. 6, only the partial solutions corresponding to locations within the dotted triangle may need to be re-processed and their partial solutions updated in the partial solution matrix, based on the removal of vertical seam 601. The partial solutions corresponding to locations outside of the dotted triangle are not affected by the removal of vertical seam 601, in this example, and may not need to be re-processed in order to identify the next lowest cost seam.

Note that in some embodiments, to update the partial solution matrix for locations within the dotted triangle, the dynamic programming problem for this region may be broken down into sub-problems as described above with respect to the original image. In other words, isolated regions (e.g., represented as bottom-up and bottom down triangles, based on the dynamic programming access pattern) may be identified within this dotted region and may be processed independently and in parallel on the four processor cores (or threads thereof). The identification of the second lowest cost seam may identify a second triangular-shaped region in which corresponding partial solutions may need to be re-processed following the removal of the second lowest cost seam. This process of identifying a next lowest cost seam and updating the partial solution matrix only in the area that contained all of the possible seams containing the initial point of that seam may be repeated following the removal of other low cost seams, as needed to achieve a resizing target.

As previously noted, the shape of an isolated region for which partial solutions to the dynamic programming problem may be independently and concurrently applied may be dependent on the access pattern of the particular dynamic programming operation used. The access pattern may in some embodiments be dependent on the energy function applied to pixels of the image (e.g., a gradient function applied to determine the energy of each pixel). The use of different energy functions and/or different dynamic programming access patterns may dictate the shape of the isolated regions. In the example above, the dynamic programming operation examines the partial solutions for three locations in the previous row (e.g., those to the "northwest," "north," and "northeast" of the current location) in generating a partial solution for a given location. Thus, each isolated region forms a triangle of locations for which the partial solutions are not dependent on those outside the region. In another example, a dynamic access pattern may examine partial solutions of locations to the "west," "northwest," and "north" of the current location, resulting in rectangular isolated regions that may be processed independently and in parallel. Since a typical dynamic programming operation may examine 3-4 partial solutions for each location, and each location (e.g., corresponding to a pixel) may have up to eight immediate neighbors, there may be many possible access patterns, and corresponding isolated regions, to which the methods described herein may be applied.

As described above, the regions identified as being isolated from each other may in various embodiments be processed independently with respect to each other and in parallel. However, these regions may be dependent on the partial solutions of another set of isolated regions, previously processed. In the previous example, the partial solutions within the bottom-down triangles were dependent on the partial solutions previously generated within the bottom-up triangles in the same row. Thus, not all of these regions (e.g., regions 510, 520, 530, and 540) may be processed at the same time. Instead, they may be processed in manner that may be referred to as "sequentially parallel." In other words, there may be dependencies between some of the regions, but if they are processed in an order in which these dependencies are addressed, they may take advantage of multithreading for those regions that are independent of each other. These methods are described in more detail in the flow diagram illustrated in FIG. 7.

Figure 7:
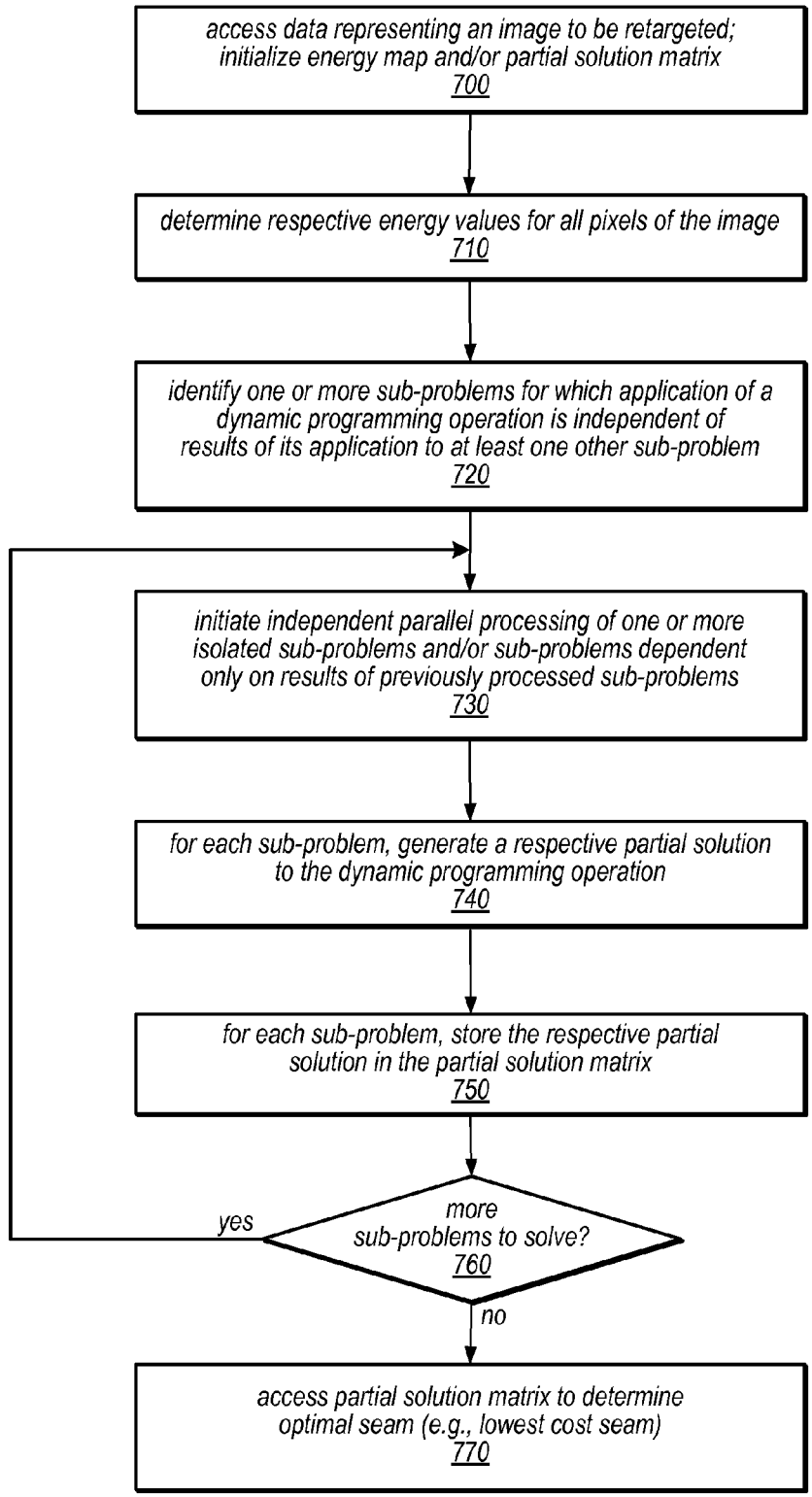
FIG. 7 is a flow diagram illustrating one embodiment of a method for generating a partial solution matrix when some sub-problems are isolated from all other sub-problems and others are dependent on other sub-problems.

FIG. 7 illustrates one embodiment of a method for generating a partial solution matrix in which some regions are isolated from all other regions, but others may be dependent on previously generated partial solutions for at least one other region. The method illustrated in FIG. 7 is similar to that illustrated in FIG. 4, but more clearly distinguishes between these two types of isolated regions. In this example, the method may include accessing data representing an image to be resized, as in 700. As in the previous examples, this data may be accessed in response to being imported into an application configured for image editing, or may be resident in memory accessible to such an application as a result of being imported previously, or as a result of being created and/or modified by the application prior to the desired resizing operation. As illustrated in FIG. 7, the method may also include initializing data structure for storing an energy map and/or a partial solution matrix for the image. As illustrated in FIG. 7, the method may include determining respective energy values for all pixels of the image, as in 710. As described above, these values may be dependent on values of pixels in the neighborhood of each pixel, and may stored in the energy map for use by the dynamic programming operation.

In this example, the method may include identifying one or more sub-problems of the dynamic programming problem that are independent of the partial solutions generated by the application of dynamic programming to at least one other sub-problem, as in 720. In other words, the method may include determining dependencies imposed by the dynamic programming access pattern and may use those to identify which sub-problems within the overall seam identification problem are isolated from each other and/or which are dependent on the partial solutions of one or more other sub-problems.

As shown in FIG. 7, the method may include initiating independent parallel processing of one or more isolated sub-problems and/or sub-problems whose partial solutions are dependent on results of previously processed sub-problems by respective processors, or by different threads of a multi-threaded multiprocessor, as in 730. Note that the number of sub-problems into which the dynamic programming problem may be divided and/or the number of sub-problems that may be solved independently and in parallel may in some embodiments be dependent on a number of available processors (or threads thereof) in the execution environment, as described above. In addition, the number of sub-problems into which the dynamic programming problem may be divided and/or the number of sub-problems that may be solved independently and in parallel may in some embodiments be further dependent on the dependencies between the isolated and partially isolated sub-problems. For example, if only one sub-problem is completely isolated from all other sub-problems, a first pass of the method may only be able to solve for the partial solution for this sub-problem, and may only keep one of the available processors (or threads thereof) busy during the first pass.

As illustrated in FIG. 7, the method may include, for each isolated sub-problem, generating a respective partial solution to the dynamic programming problem, as in 740, and adding it to the partial solution matrix, as in 750. If there are more sub-problems to solve, shown as the positive exit from 760, the method may include repeating the operations shown as 730-750 for additional sub-problems. In this example, the second pass may be able to solve for the partial solutions to any sub-problems that are dependent only on the partial solution to the one sub-problem solved in the first pass, and that are isolated from each other. Similarly, the third pass may be able to solve for the partial solutions to any sub-problems that are dependent only on the partial solutions to sub-problems solved in the first or second passes, and that are isolated from each other and so on.

In this example, if there are not enough processors or threads on which to solve all of the sub-problems identified as being isolated from each other and dependent only on previously generated partial solutions in a given pass, one or more additional passes may be performed until all of the partial solutions have been generated and stored in the partial solution matrix. Once all of the sub-problems have been solved, shown as the negative exit from 760, the method may continue by accessing the partial solution matrix to determine the overall solution, i.e. the optimal (e.g., lowest-cost) seam of the image. This is shown as 770 in FIG. 7. Again note that the method illustrated in FIG. 7 and described herein may be iteratively applied to an input image to identify and remove (or replicate) multiple vertical and/or horizontal seams to achieve a target size and/or aspect ratio for resizing the input image.

The methods illustrated in FIG. 7 and described above may be further illustrated by way of an example dependency diagram for a dynamic programming operation that may lend itself to such sequentially parallel multithreading. FIG. 8 illustrates a data structure 850 representing a dependency diagram for an input image. In this example, the access pattern of the dynamic programming operation may examine the partial solutions for locations "north" and "northeast" of each location to determine the partial solution at that location, or may examine the partial solutions in the set of locations ("northwest," "north," "northeast") of each location. In this example, the sub-problems into which the dynamic programming problem is divided, represented in FIG. 8 by parallelograms in four rows, are not completely optimized for this access pattern.

As illustrated in FIG. 8, the sub-problems corresponding to the locations within isolated region 810 may only be dependent on the partial solutions for other locations within the region. However, the sub-problems corresponding to several of the locations within partially isolated region 830 (on the first row) are dependent on partial solutions of locations with isolated region 810. Therefore, the partial solutions corresponding to locations in these three regions cannot all be generated independently and in parallel within a given pass. Similarly, the sub-problems corresponding to some of the locations within partially isolated region 840 (on the first row) and partially isolated region 820 (on the second row) are dependent on partial solutions of locations within isolated region 810 and/or partially isolated region 830. In this example, as each sub-problem is solved (i.e., as each region is processed), the dependencies of the sub-problems corresponding to the regions to the "east" and "southeast" of the processed region are satisfied, and may themselves be ready for processing by the next available processor or thread.

In the example illustrated in FIG. 8, it is again assumed that four processor cores (or threads thereof) are available for multithreaded processing of the dynamic programming problem. In this example, on a first iteration of the method described in FIG. 7, only one of these processor cores (or threads) will be employed in the operation, because only isolated region 810 is truly isolated from all other regions with respect to the dynamic processing problem. Similarly, on a second iteration, only one of the processor cores (or threads) will be employed in the operation, because only partially isolation region 830 is dependent only on isolated region 810. The legend in FIG. 8 illustrates which sub-problems (represented by different collections of parallelograms) may be processed on each of ten passes of the method, according to their dependencies on other sub-problems. In this example, two processor cores (or threads) may be employed in passes 3-8, to generate partial solutions corresponding to additional partially isolated regions, respectively, while only one processor core (or thread) may be employed in passes 9 and 10. In this example, there are no passes in which all four cores are employed concurrently, because at no time have dependencies been met for four sub-problems at one time. However, if a similar division of a dynamic programming problem were applied to a larger image, the processing of the image using such partially isolated parallelograms may include the concurrent processing of four, or even more, sub-problems (e.g., up to the number of available processor cores or threads), as the partial solutions on which they depend are generated and stored in a partial solution matrix.

As previously noted, breaking a dynamic programming problem employed in seam carving into isolated or partially isolated sub-problems for parallel processing may in various embodiments facilitate the efficient computation of a partial solution matrix. This may, in turn, improve the speed of the dynamic programming step in a seam carving operation such that interactive image editing may be supported with acceptable performance. In some embodiments, breaking the dynamic programming problem into partially isolated sub-problems that may not be fully optimized for the dynamic programming access pattern, as in the example illustrated in FIG. 8, may allow larger portions of the image data to be processed at once to generate the partial solution matrix. Such a method may in some embodiments be very efficient for generating a partial solution matrix for large images. In various embodiments, the dynamic programming problem may be broken into sub-problems such that utilization of available processors cores (or threads thereof) is maximized and/or such that the sub-problems are of a size that they are cache-friendly. A partial solution matrix generated using the methods described herein may in various embodiments be used in determining the lowest-cost seam of an image for a seam carving operation. Note that by iteratively applying the dynamic programming methods described herein, a retargeting matrix may be pre-computed, as described herein.

In various embodiments, a retargeting operation, such as that illustrated as 230 in FIG. 2, may access a pre-computed retargeting matrix of an input image and may remove or replicate pixels of one or more low-cost seams of the image according to the values stored therein. In the example described above, to remove the lowest cost horizontal seam in the image, all pixels associated with a horizontal seam value of "1" may be identified and removed from the image data, or to duplicate the third lowest cost vertical seam, all the pixels associated with a vertical seam value of "3" may be identified and replicated in the image data. Note that for a large image (and corresponding large retargeting matrix), a retargeting operation that sequentially visits data associated with each pixel in the entire retargeting matrix to identify and remove (or replicate) those having a particular horizontal or vertical seam value (or one of several horizontal or vertical seam values, when two or more seams are to be removed or replicated) may be extremely slow.

In some embodiments, a retargeting operation may include dividing a retargeting matrix, such as those described herein, into sub-matrices and processing some or all of them independently and/or in parallel. In some embodiments, such a method may allow the retargeting operation to exploit the processing power of multiple cores present in many modern day computing systems. The method may also ensure that the retargeting operation operates on a data set that can fit into memory. For example, for a horizontal seam carving operation (e.g., one involving the removal or replication of one or more horizontal seams), the retargeting matrix may be divided into two or more sub-matrices, each comprising entries corresponding to pixels in non-overlapping horizontal strips in the image. In this example, these sub-matrices may be processed in parallel on different processors, or by different threads of a multi-threaded multiprocessor. Similarly, for a vertical seam carving operation, the retargeting matrix may be divided into two or more sub-matrices, each comprising entries corresponding to pixels in non-overlapping vertical strips in the image, for parallel processing.

Figure 9:
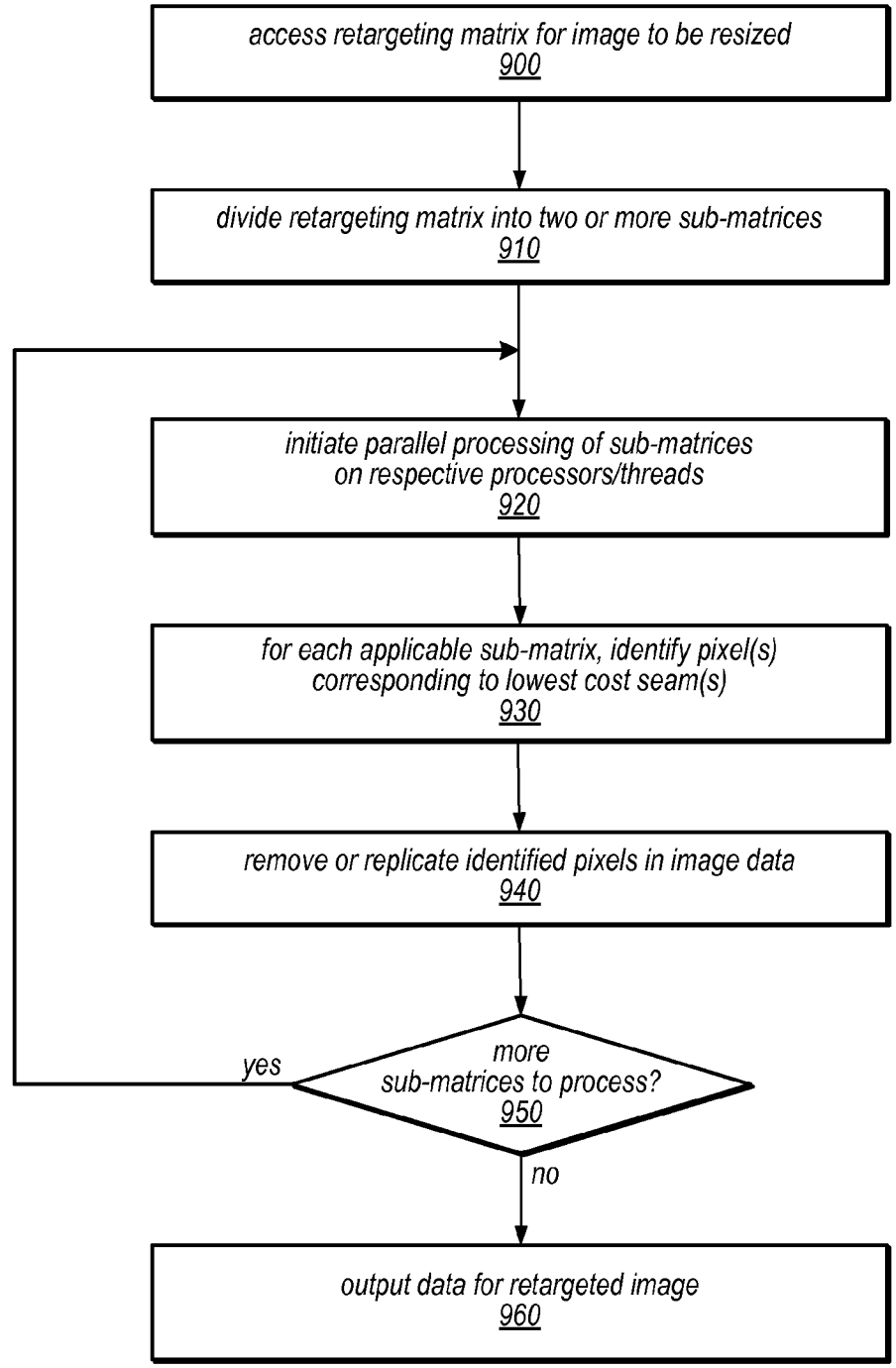
FIG. 9 is a flow diagram illustrating a method for performing parallel processing of a retargeting matrix in an image resizing operation, according to one embodiment.

FIG. 9 is a flow diagram illustrating one such method for performing parallel processing of a retargeting matrix in an image resizing operation of a graphics application, according to one embodiment. As illustrated in FIG. 9, the method may include accessing a retargeting matrix for an image to be resized. As described herein, the retargeting matrix may in various embodiments have been provided with the image (e.g., by a third party provider of the image and associated meta-data), or may have been pre-computed by the graphics application in response to accessing or opening an image file, saving an image file, or invoking a resizing operation on an input image. In some embodiments, a single retargeting matrix may be associated with an input image and may include, for each pixel, a horizontal seam value and a vertical seam value identifying horizontal and vertical seams, respectively, that contain the pixel (e.g., ordinal numbers representing the seams' relative costs). In other embodiments, two such retargeting matrices may be associated with an input image, one containing horizontal seam values or identifiers associated with each pixel of the input image and the other containing vertical seam values or identifiers associated with each pixel of the input image.

In this example, the method may include dividing the retargeting matrix into two or more sub-matrices, as in 910. As described herein, each sub-matrix may include entries corresponding to a non-overlapping horizontal or vertical strip in the input image. For example, in embodiments in which a two retargeting matrices are associated with an input image, the method may include dividing the retargeting matrix that includes horizontal seam values into two or more sub-matrices corresponding to horizontal strips in the input image and dividing the retargeting matrix that includes vertical seam values into two or more sub-matrices corresponding to vertical strips in the input image. Similarly, in embodiments in which a single retargeting matrix includes both horizontal and vertical seam values, the method may include dividing the retargeting matrix into two or more sub-matrices corresponding to horizontal strips in the input image and two or more other sub-matrices corresponding to vertical strips in the input image. Each sub-matrix that includes horizontal seam values may include horizontal seam values associated with pixels in a given range of columns of the input image, while each sub-matrix that includes vertical seam values may include vertical seam values associated with pixels in a given range of rows of the input image. For example, one sub-matrix may include horizontal seam values associated with pixels in columns 1-100 of a given input image, while another may include vertical seam values associated with pixels in rows 300-450. Note that in some embodiments, each sub-matrix that includes horizontal seam values may be associated with pixels in the same number of columns and/or each sub-matrix that includes vertical seam values may be associated with pixels in the same number of rows. In other embodiments, not all sub-matrices (e.g. for a given direction) may correspond to the same number of pixels, rows, or columns as other sub-matrices.

As illustrated in FIG. 9, the method may include initiating parallel processing of each sub-matrix on a respective one of a plurality of available processors (or threads thereof) in the execution environment of the graphics application, as in 920. Note that the number of strips into which a retargeting matrix may be sub-divided may in some embodiments be dependent on a number of available processors (or threads thereof) in the execution environment. In some embodiments, the number of sub-matrices into which a retargeting matrix is divided may be equal to, or a multiple of, the number of processors or threads available in the system. For example, in a system that includes 16 available processors, the retargeting matrix (or matrices) may be divided into 8 sub-matrices containing seam values corresponding to pixels in one of 8 non-overlapping horizontal strips in the input image, and 8 sub-matrices containing seam values corresponding to pixels in one of 8 non-overlapping vertical strips in the input image. In this example, all 16 sub-matrices may be processed in parallel on the 16 available processors. In another example, in a system that includes 8 available threads, the retargeting matrix (or matrices) may be divided into 16 sub-matrices corresponding to 8 horizontal strips and 8 vertical strips, and half of these strips may be processed at a time, followed by the other half. In other embodiments, the number of sub-matrices into which a retargeting matrix is divided may not be related to the number of available processors or threads, but may be determined arbitrarily or using other methods and/or criteria.

As illustrated in FIG. 9, the method may include, for each applicable sub-matrix being processed, identifying any pixel(s) within the strip represented by the sub-matrix corresponding to one or more low-cost seams identified for removal or replication, as in 930. For example, if the retargeting operation is to remove one horizontal seam of the image (i.e., the lowest-cost horizontal seam), processing each applicable sub-matrix may include searching each sub-matrix that includes horizontal seam values for any pixels associated with a horizontal seam value of "1" (as shown in 930) and removing those pixels from the image data (e.g., removing the pixels from intermediate image data to be displayed to the user following the retargeting operation), as in 940. Note that the pixels of the lowest cost seam may not all be included in the same horizontal strip of the image, since a horizontal seam having a lowest cost may include pixels on different rows of the image, and these rows may be included in different strips when the data associated with the image is sub-divided for parallel processing. Thus, the seam values associated with the pixels of the seam may be included in two or more sub-matrices, in some cases. However, processing of each sub-matrix (for each respective horizontal strip) may be carried out in parallel, since there are no dependencies between the operations performed on each sub-matrix (e.g., between the searches). In another example, if the retargeting operation is to replicate the three lowest-cost vertical seams, processing each sub-matrix may include searching each sub-matrix that includes vertical seam values for any pixels associated with vertical seam values of "1," "2," or "3" (as shown in 930) and replicating those pixels in the image data, as in 940. In some embodiments, removing or replicating pixels in an image results in a shifting of pixels in the image. For example, when pixels of a given horizontal seam are removed, all the pixels below the removed pixels may be shifted up by one position in the image, and the image is shortened by one pixel. Similarly, when pixels of a given vertical seam are replicated, all the pixels to the right of the replicated pixels may be shifted one position to the right to make room for the inserted pixels. Note that in some embodiments, this shifting of pixels may be a relatively fast operation. For example, this shifting operation may be especially fast in embodiments in which the image data being processed by a single processor/thread in the retargeting operation (e.g., data for a given image strip corresponding to one of the retargeting sub-matrices) fits in local memory and/or a cache associated with the processor/thread.

Note that in some embodiments, a resizing operation may be applied iteratively, searching for and removing (or replicating) pixels of one seam at a time (e.g., searching for one horizontal or vertical seam value in the applicable sub-matrices at a time). In other embodiments, a resizing operation may be configured to identify a range of two or more seam values for removal or replication, and to search for seam values in this range in a single search of each sub-matrix. In still other embodiments, a given retargeting operation may be directed to both horizontal and vertical resizing, and may be configured to perform them all in parallel (with some processors/threads searching horizontal seam values while others search vertical seam values), to perform them sequentially (e.g., performing parallel processing all of the horizontal strips first, then parallel processing of all of the vertical strips), or to perform them in an alternating fashion (performing one or more parallel searches of horizontal seam values, followed by one or more parallel searches of vertical seam values, followed by additional searches of horizontal seam values, etc.)

Note also that in some embodiments, retargeting operations are always performed on retargeting matrix data pre-computed from original input image data. In such embodiments, during a given interactive resizing operation (e.g., until a resized image is saved or changes thereto are committed), a series of resizing operations may be requested and performed using the pre-computed horizontal and vertical seam values (e.g., by the user dragging a corner or other handle of the image using a graphical user interface), without making any updates to the retargeting matrix or sub-matrices themselves following each change in the size and/or aspect ratio of the image. The intermediate image data produced by these operations may in some embodiments be updated on the fly by repeatedly searching the sub-matrices for pixels to remove or replicate as the user interactively resizes the image. In some embodiments, each of these searches may involve a look-up operation on the data structures representing the sub-matrices, and may be a relatively fast operation when the data set is small enough to fit in memory (e.g., in a cache associated with a given one of the parallel processors or threads).

As noted above, the number of sub-matrices into which a retargeting matrix may be divided may not be equal to the number of processors or threads available for parallel processing. As illustrated in FIG. 9, if, after processing some number of sub-matrices as in the operations shown in 920-940, there are more sub-matrices to be processed, the method may include repeating those operations for additional sub-matrices, until all applicable sub-matrices have been processed. This is shown as the feedback from the positive exit of 950 to 920. Once all applicable sub-matrices have been processed for a given retargeting operation, shown as the negative exit from 950, the method may include providing output data for the retargeted image, as in 960. For example, image data from which pixels have been removed and/or in which pixels have been replicated using the methods illustrated in FIG. 9 may be provided to a display component of the application for display of the resized image to the user and/or the data may be stored as an intermediate image by the image editing application for further processing by the application (or another application) or as a final image (e.g., written to main memory, a file, an archive, etc.).

Figure 10:
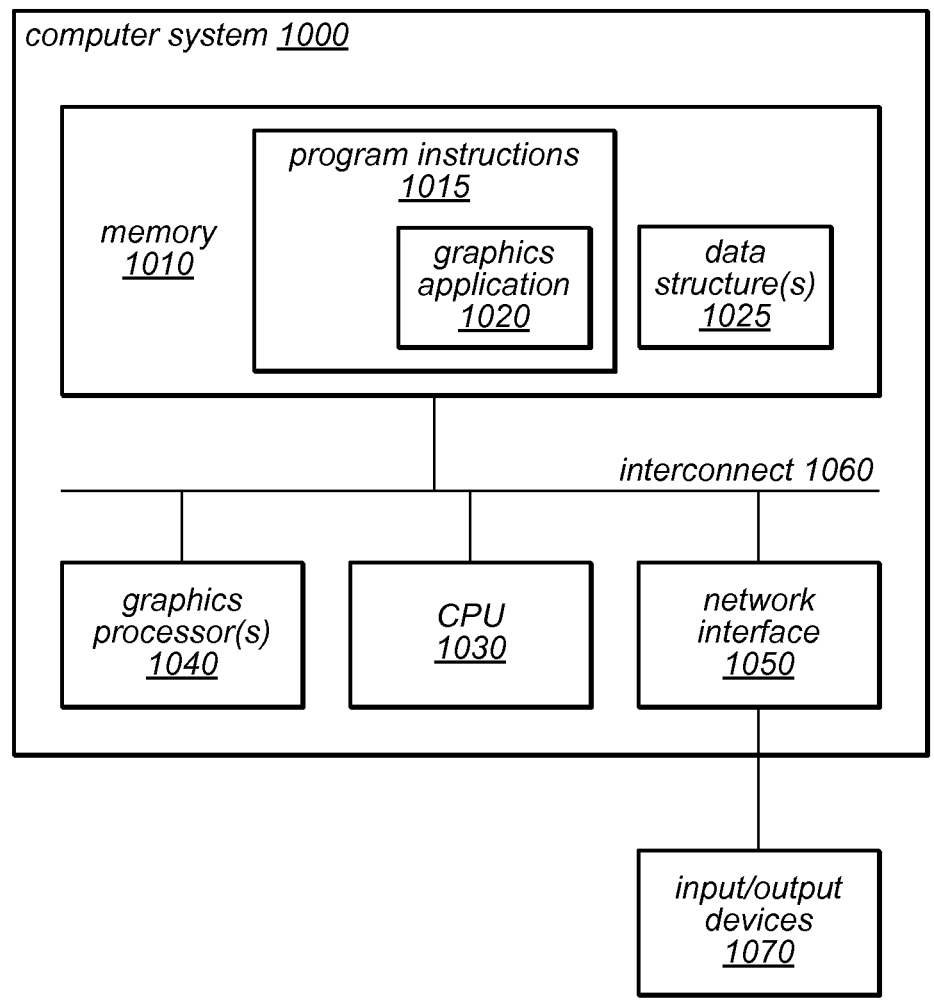
FIG. 10 illustrates a computer system configured to implement resizing of input images using a partial solution matrix for a dynamic programming operation, according to one embodiment.

The methods described herein for resizing and retargeting images (e.g., within a graphics application) may be implemented by a computer system configured to provide the functionality described. FIG. 10 is a block diagram illustrating one embodiment of a computer system 1000 configured for implementing the methods described herein. In this example, a graphics application such as graphics application 1020 may be configured to perform resizing on image data as part of various editing functions and to render new images according to the resizing. For example, graphics application 1020 may perform reductions and/or expansions of various images using seam-based techniques, as described herein, to resize an input image, according to various embodiments. Graphics application 1020 may be configured to render the resized image to a separate window, or directly into the same frame buffer containing the input image, in different embodiments.

Graphics application 1020 may represent various types of graphics applications, such as painting, publishing, photography, games, animation, and other applications. Additionally, graphics application 1020 may utilize a graphics processor 1040 when rendering or displaying images according to various embodiments. A graphics processing unit or GPU may be considered a dedicated graphics-rendering device for a personal computer, workstation, game console or other computer system. Modem GPUs may be very efficient at manipulating and displaying computer graphics and their highly parallel structure may make them more effective than typical CPUs for a range of complex graphical algorithms. For example, graphics processor 1040 may implement a number of graphics primitive operations in a way that makes executing them much faster than drawing directly to the screen with a host central processing unit (CPU), such as CPU 1030. In various embodiments, the methods disclosed herein for generating a retargeting matrix and/or the methods disclosed herein for performing resizing of an image may be implemented by program instructions configured for parallel execution on two or more such GPUs. For example, in some embodiments, two or more sub-matrices of a retargeting matrix (i.e., each corresponding to a horizontal or vertical strip in the image) may be processed in parallel by two or more such GPUs. The GPU 1000 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, graphics application 1020 may, in some embodiments, be part of, or performed by, one or more graphics processors, such as graphics processor 1040. As described above, in some embodiments graphics application 1020 may be configured to render resized images into a different window than input images.

Resizing of images, as described herein, may be implemented on various types of computer systems. Referring again to FIG. 10, computer system 1000 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1020, which may be configured to implement the resizing techniques described herein, may be provided as a computer program product, or software, that may include a computer-readable storage medium having stored thereon instructions, which may be used to program a computer system (or other electronic devices) to implement image resizing and/or generation of a retargeting matrix, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 10, computer system 1000 may include one or more processor units (CPUs) 1030. Processors 1030 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Note that in various embodiments, the methods disclosed herein for generating a retargeting matrix and/or the methods disclosed herein for performing resizing of an image may be implemented by program instructions configured for parallel execution on two or more such CPUs. For example, in some embodiments, two or more sub-matrices of a retargeting matrix (i.e., each corresponding to a horizontal or vertical strip in the image) may be processed in parallel by two or more such CPUs. Any desired operating system(s) may be run on computer system 1000, such as various versions of Unix, Linux, Windows™ from Microsoft Corporation, MacOS™ from Apple Corporation, or any other operating system that enables the operation of software on a hardware platform.

The computer system 1000 may also include one or more system memories 1010 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1000 via interconnect 1060. Memory 1010 may include other types of memory as well, or combinations thereof. One or more of memories 1010 may include program instructions 1015 executable by one or more of processors 1030 to implement aspects of the image resizing techniques described herein. Program instructions 1015, which may include program instructions configured to implement graphics application 1020, may be partly or fully resident within the memory 1010 of computer system 1000 at any point in time. Alternatively, program instructions 1015 may be provided to GPU 1040 for performing resizing operations (or portions thereof) on GPU 1040 using one or more of the techniques described herein. In some embodiments, the techniques described herein may be implemented by a combination of program instructions 1015 executed on one or more processors 1030 and one or more GPUs 1040, respectively. Program instructions 1015 may also be stored on an external storage device (not shown) accessible by the processor(s) 1030 and/or GPU 1040, in some embodiments. Any of a variety of such storage devices may be used to store the program instructions 1015 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1030 and/or GPU 1040 through one or more storage or I/O interfaces including, but not limited to, interconnect 1060 or network interface 1050, as described herein. In some embodiments, the program instructions 1015 may be provided to the computer system 1000 via any suitable computer-readable storage medium including memory 1010 and/or external storage devices described above. Memory 1010 may also be configured to implement one or more data structures 1025, such as an energy map, a retargeting matrix, various sub-matrices of a retargeting matrix, and/or structures configured to store data representing one or more input images, output images, or intermediate images. Data structures 1025 may be accessible by processor(s) 1030 and/or GPU 1040 when executing graphics application 1020 or other program instructions 1015.

As shown in FIG. 10, processor(s) 1030 may be coupled to one or more of the other illustrated components by at least one communications bus, such as interconnect 1060 (e.g., a system bus, LDT, PCI, ISA, or other communication bus type), and a network interface 1050 (e.g., an ATM interface, an Ethernet interface, a Frame Relay interface, or other interface). The CPU 1030, the network interface 1050, and the memory 1010 may be coupled to the interconnect 1060. It should also be noted that one or more components of system 1000 might be located remotely and accessed via a network.

As noted above, in some embodiments, memory 1010 may include program instructions 1015, comprising program instructions configured to implement graphics application 1020, as described herein. Graphics application 1020 may be implemented in various embodiments using any desired programming language, scripting language, or combination of programming languages and/or scripting languages, e.g., C, C++, C#, Java™, Perl, etc. For example, in one embodiment, graphics application 1020 may be JAVA based, while in another embodiments, it may be implemented using the C or C++ programming languages. In other embodiments, graphics application 1020 may be implemented using specific graphic languages specifically for developing programs executed by specialize graphics hardware, such as GPU 1040. In addition, graphics application 1020 may be embodied on memory specifically allocated for use by graphics processor(s) 1040, such as memory on a graphics board including graphics processor(s) 1040. Thus, memory 1010 may represent dedicated graphics memory as well as general-purpose system RAM, in various embodiments. Memory 1010 may in some embodiments also include a data store configured to store image data for one or more input images and/or output images, in various embodiments. Other information not described herein may be included in memory 1010 and may be used to implement the methods described herein and/or other functionality of computer system 1000.

Network interface 1050 may be configured to enable computer system 1000 to communicate with other computers, systems or machines, such as across a network. Network interface 1050 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1000 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1050 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1040 may be implemented in a number of different physical forms. For example, GPU 1040 may take the form of a dedicated graphics card, an integrated graphics solution and/or a hybrid solution. GPU 1040 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 10, memory 1010 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1040 and the rest of the computer system 1000 may travel through a graphics card slot or other interface, such as interconnect 1060 of FIG. 10.

Computer system 1000 may also include one or more additional I/O interfaces, such as interfaces for one or more user input devices 1070, or such devices may be coupled to computer system 1000 via network interface 1050. For example, computer system 1000 may include interfaces to a keyboard, a mouse or other cursor control device, a joystick, or other user input devices 1070, in various embodiments. Additionally, the computer system 1000 may include one or more displays (not shown), coupled to processors 1030 and/or other components via interconnect 1060 or network interface 1050. Such input/output devices may be configured to allow a user to interact with graphics application 1020 to request various resizing operations and/or to specify various parameters, thresholds, and/or other configurable options available to the user when editing images executing graphic application 1020. It will be apparent to those having ordinary skill in the art that computer system 1000 may also include numerous other elements not shown in FIG. 10.

Note that program instructions 1015 may be configured to implement a graphic application 1020 as a stand-alone application, or as a module of another graphics application or graphics library, in various embodiments. For example, in one embodiment program instructions 1015 may be configured to implement graphics applications such as painting, publishing, photography, games, animation, and/or other applications, and may be configured to resize images as part of one or more of these graphics applications. In another embodiment, program instructions 1015 may be configured to implement the resizing techniques described herein in one or more functions called by another graphics application executed on GPU 1040 and/or processor(s) 1030. In various embodiments, program instructions 1015 may be configured to compute a partial solution matrix by processing isolated or partially isolated sub-problems independently and in parallel, to pre-compute a retargeting matrix as a stand-alone utility, and/or to pre-compute a retargeting matrix, sub-divide a retargeting matrix, and/or process the information provided in such a retargeting matrix as a utility provided in a graphics application or as part of performing an image resizing operation in a graphics application. Program instructions 1015 may also be configured to render images and present them on one or more displays as the output of a resizing operation and/or to store image data for resized images in memory 1010 and/or an external storage device(s), in various embodiments. For example, a graphics application 1020 included in program instructions 1015 may utilize GPU 1040 when resizing, rendering, or displaying images in some embodiments.

While various resizing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system comprising:
one or more processors; and
memory coupled to the one or more processors, the memory comprising instructions executable by the one or more processors to:
resize an image in one direction by seam carving along a lowest-cost seam of the image, discovery of the lowest-cost seam comprising:
identifying a first portion of the image, having a predetermined shape, for which a partial solution to a dynamic programming problem for finding the lowest energy values of the image can be solved independent of a partial solution to the dynamic programming problem for finding the lowest energy values of a second portion of the image, the second portion of the image having the predetermined shape and not overlapping the first portion of the image;

generating a partial solution to the dynamic programming problem for finding the lowest energy values of the first portion of the image and a partial solution to the dynamic programming problem for finding the lowest energy values of the second portion of the image independently and concurrently on respective ones of the one or more processors; and determining a solution to the dynamic programming problem for the image dependent at least in part on the partial solution to the dynamic programming problem for finding the lowest energy values of the first portion of the image and the partial solution to the dynamic programming problem for finding the lowest energy values of the second portion of the image.

2. The system of claim 1, wherein the instruction are further executable to resize the image in a second direction.

3. The system of claim 1, wherein said determining the solution to the dynamic programming problem further comprises identifying a second lowest-cost seam of the image.

4. The system of claim 1, wherein said determining a solution further comprises generating a retargeting matrix comprising an indication of a cost order of each of a plurality of seams in the image, wherein the indication is associated with each of the pixels of the seam.

5. The system of claim 1, wherein cost associated with the lowest-cost seam is dependent on one or more of: a sum of respective energy values of all pixels of the seam, an average of respective energy values of all pixels of the seam, a weighted average of respective energy values of all pixels of the seam, and a maximum value of respective energy values of all pixels of the seam.

6. The system of claim 1, wherein instruction are further executable to resize the image further comprises:

storing the partial solution for the first portion of the image and the partial solution for the second portion of the image in a data structure in the memory; and wherein said determining a solution comprises accessing the data structure.

7. The system of claim 1, wherein said identifying is dependent on a pattern of accesses of partial solutions employed in solving the dynamic programming problem.

8. The system of claim 1, wherein the partial solution to the dynamic programming problem for the first or second portion of the image is dependent on a partial solution to the dynamic programming problem for a third portion of the image, the third portion having the predetermined shape and not overlapping the first or second portions.

9. The system of claim 8, wherein the generating of the partial solution for the third portion of the image occurs prior to said generating a partial solution for the first or second portion of the image.

10. The system of claim 1, the instructions further executable to:

receive user input indicating a request to resize the image; and wherein said identifying a portion of an image, said generating, and said determining a solution are performed in response to said receiving.

11. The system of claim 1, wherein the one or more processors comprise at least one of: a general-purpose central processing unit (CPU) and a graphics processing unit (GPU).

12. One or more tangible computer-readable storage media comprising multiple instructions stored thereon that responsive to execution by one or more processors, cause the one or more processors to:

resize an image in one direction by seam carving along a lowest-cost seam of the image, discovery of the lowest-cost seam comprising:

identifying a first portion of the image, having a predetermined shape, for which a partial solution to a dynamic programming problem for finding the lowest energy values of the image can be solved independent of a partial solution to the dynamic programming problem for finding the lowest energy values of a second portion of the image, the second portion of the image having the predetermined shape and not overlapping the first portion of the image;

generating a partial solution to the dynamic programming problem for finding the lowest energy values of the first portion of the image and a partial solution to the dynamic programming problem for finding the lowest energy values of the second portion of the image independently and concurrently; and determining a solution to the dynamic programming problem for the image dependent at least in part on the partial solution to the dynamic programming problem for finding the lowest energy values of the first portion of the image and the partial solution to the dynamic programming problem for finding the lowest energy values of the second portion of the image.

13. The one or more tangible computer-readable storage media of claim 12, the instructions being configured to resize the image in a second direction.

14. The one or more tangible computer-readable storage media of claim 12, wherein said determining the solution to the dynamic programming problem further comprises identifying a second lowest-cost seam of the image.

15. The one or more tangible computer-readable storage media of claim 12, wherein said determining a solution further comprises generating a retargeting matrix comprising an indication of a cost order of each of a plurality of seams in the image, wherein the indication is associated with each of the pixels of the seam.

16. The one or more tangible computer-readable storage media of claim 12, the instructions being configured to:

store the partial solution for the first portion of the image and the partial solution for the second portion of the image in a data structure in the memory; and wherein said determining a solution comprises accessing the data structure.

17. The one or more tangible computer-readable storage media of claim 12, wherein said identifying is dependent on a pattern of accesses of partial solutions employed in solving the dynamic programming problem.

18. The one or more tangible computer-readable storage media of claim 12, wherein the partial solution to the dynamic programming problem for the first or second portion of the image is dependent on a partial solution to the dynamic programming problem for a third portion of the image, the third portion having the predetermined shape and not overlapping the first or second portions.

19. The one or more tangible computer-readable storage media of claim 18, the instructions being configured to, prior to said generating a partial solution for the first or second portion of the image, generating a partial solution for the third portion of the image.

20. The one or more tangible computer-readable storage media of claim 12, the instructions being configured to:
   receive user input indicating a request to resize the image; and
   wherein said identifying a portion of an image, said generating, and said determining a solution are performed in response to said receiving.

21. A computer-implemented method for resizing an image in one direction by seam carving along a lowest-cost seam of the image comprising:
   identifying a first portion of the image, having a predetermined shape, for which a partial solution to a dynamic programming problem for finding the lowest energy values of the image can be solved independent of a partial solution to the dynamic programming problem for finding the lowest energy values of a second portion of the image, the second portion of the image having the predetermined shape and not overlapping the first portion of the image;
   generating a partial solution to the dynamic programming problem for the first portion of the image and a partial solution to the dynamic programming problem for finding the lowest energy values of the second portion of the image independently and concurrently; and
   determining a solution to the dynamic programming problem for the image dependent at least in part on the partial solution to the dynamic programming problem for finding the lowest energy values of the first portion of the image and the partial solution to the dynamic programming problem for finding the lowest energy values of the second portion of the image.

22. The method of claim 21, further comprising, resizing the image in a second direction.

23. The method of claim 21, wherein said determining the solution to the dynamic programming problem further comprises identifying a second lowest-cost seam of the image.

24. The method of claim 21, wherein said determining a solution further comprises generating a retargeting matrix comprising an indication of a cost order of each of a plurality of seams in the image, wherein the indication is associated with each of the pixels of the seam.

25. The method of claim 21, further comprising:
   storing the partial solution for the first portion of the image and the partial solution for the second portion of the image in a data structure in the memory;
   wherein said determining a solution comprises accessing the data structure.

26. The method of claim 21, wherein said identifying is dependent on a pattern of accesses of partial solutions employed in solving the dynamic programming problem.

27. The method of claim 21, wherein the partial solution to the dynamic programming problem for the first or second portion of the image is dependent on a partial solution to the dynamic programming problem for a third portion of the image, the third portion having the predetermined shape and not overlapping the first or second portions.

28. The method of claim 27, further comprising:
   prior to said generating a partial solution for the first or second portion of the image, generating a partial solution for the third portion of the image.

29. The method of claim 21, further comprising:
   receiving user input indicating a request to resize the image;
   wherein said identifying a portion of an image, said generating, and said determining a solution are performed in response to said receiving.

* * * * *